United States Patent
Kakivaya et al.

(10) Patent No.: US 8,417,813 B2
(45) Date of Patent: Apr. 9, 2013

(54) RENDEZVOUSING RESOURCE REQUESTS WITH CORRESPONDING RESOURCES

(75) Inventors: Gopala Krishna R. Kakivaya, Sammamish, WA (US); Richard L. Hasha, Seattle, WA (US); Thomas Lee Rodeheffer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 57 days.

(21) Appl. No.: 13/155,113

(22) Filed: Jun. 7, 2011

(65) Prior Publication Data

US 2011/0235551 A1    Sep. 29, 2011

Related U.S. Application Data

(63) Continuation of application No. 11/220,756, filed on Sep. 7, 2005, now Pat. No. 8,014,321, which is a continuation of application No. 10/971,451, filed on Oct. 22, 2004, now abandoned.

(51) Int. Cl.
    *G06F 15/173* (2006.01)
(52) U.S. Cl. ................................................ 709/224
(58) Field of Classification Search .......... 709/224, 709/226, 223
    See application file for complete search history.

(56) References Cited

U.S. PATENT DOCUMENTS

| | | | |
|---|---|---|---|
| 5,689,701 A | 11/1997 | Ault et al. | |
| 5,745,683 A | 4/1998 | Lee et al. | |
| 5,831,975 A | 11/1998 | Chen | |
| 6,115,804 A | 9/2000 | Carpenter | |
| 6,243,814 B1 | 6/2001 | Matena | |
| 6,253,292 B1 | 6/2001 | Jhang | |
| 6,269,085 B1 | 7/2001 | Provino | |
| 6,279,034 B1 | 8/2001 | Jarriel et al. | |
| 6,304,556 B1 | 10/2001 | Haas | |
| 6,411,967 B1 | 6/2002 | Van Renesse | |
| 6,449,641 B1 | 9/2002 | Moiin | |
| 6,456,597 B1 | 9/2002 | Bare | |
| 6,480,473 B1 | 11/2002 | Chambers | |
| 6,542,513 B1 | 4/2003 | Franke | |
| 6,546,415 B1 | 4/2003 | Park | |
| 6,553,377 B1 | 4/2003 | Eschelbeck et al. | |

(Continued)

FOREIGN PATENT DOCUMENTS

| EP | 1139602 | 10/2001 |
|---|---|---|
| EP | 1398924 | 3/2004 |

(Continued)

OTHER PUBLICATIONS

Notice of Allowance dated Sep. 14, 2011 cited in U.S. Appl. No. 11/428,146.

(Continued)

*Primary Examiner* — Fan Ng
(74) *Attorney, Agent, or Firm* — Workman Nydegger

(57) ABSTRACT

Methods, systems and computer program products are provided for rendezvousing resource requests with corresponding resources. Doubly linked sorted lists are traversed using modulo arithmetic in both directions. Sorted lists can be partitioned based on a multiple proximity metrics. Node routing tables provide a logarithmic index to nodes within the ID space of the federation infrastructure to facilitate more efficient routing. Messages can be routed to nodes within a ring and proximally routed to nodes in other partitioned rings.

20 Claims, 11 Drawing Sheets

U.S. PATENT DOCUMENTS

| | | |
|---|---|---|
| 6,615,362 B1 | 9/2003 | Daruwalla |
| 6,708,198 B1 | 3/2004 | Simmons |
| 6,775,703 B1 | 8/2004 | Burns |
| 6,836,756 B1 | 12/2004 | Gruber |
| 6,850,987 B1 | 2/2005 | McCanne |
| 6,909,721 B2 | 6/2005 | Ekberg |
| 6,917,985 B2 | 7/2005 | Madruga |
| 6,928,578 B2 | 8/2005 | Archibald |
| 6,947,963 B1 | 9/2005 | Agarwal |
| 6,980,555 B2 | 12/2005 | Mar |
| 6,983,397 B2 | 1/2006 | Fairhurst |
| 6,988,173 B2 | 1/2006 | Blake |
| 7,043,550 B2 | 5/2006 | Knop |
| 7,062,563 B1 | 6/2006 | Lewis |
| 7,076,507 B1 | 7/2006 | Tarin |
| 7,085,825 B1 | 8/2006 | Pishevar |
| 7,103,884 B2 | 9/2006 | Fellin |
| 7,117,273 B1 | 10/2006 | O'Toole et al. |
| 7,120,824 B2 | 10/2006 | Burton |
| 7,137,018 B2 | 11/2006 | Gutman et al. |
| 7,139,270 B1 | 11/2006 | Fatehi et al. |
| 7,139,930 B2 | 11/2006 | Mashayekhi |
| 7,177,646 B2 | 2/2007 | O'Neill et al. |
| 7,181,547 B1 | 2/2007 | Millet |
| 7,231,463 B2 | 6/2007 | Nagendra |
| 7,324,440 B2 | 1/2008 | Takagi |
| 7,334,062 B1 | 2/2008 | Agarwal et al. |
| 7,353,335 B2 | 4/2008 | Kawamura |
| 7,362,718 B2 | 4/2008 | Kakivaya |
| 7,373,468 B1 | 5/2008 | Gupta |
| 7,379,994 B2 | 5/2008 | Collazo |
| 7,404,006 B1 | 7/2008 | Slaughter |
| 7,453,884 B2 | 11/2008 | Ma |
| 7,463,648 B1 | 12/2008 | Eppstein |
| 7,466,662 B2 | 12/2008 | Kakivaya |
| 7,467,265 B1 | 12/2008 | Tawri et al. |
| 7,478,263 B1 | 1/2009 | Kownacki |
| 7,512,649 B2 | 3/2009 | Faybishenko |
| 7,571,290 B1 | 8/2009 | Ranade et al. |
| 7,613,703 B2 | 11/2009 | Kakivaya |
| 7,617,289 B2 | 11/2009 | Srinivasan et al. |
| 7,624,194 B2* | 11/2009 | Kakivaya et al. ............. 709/243 |
| 7,694,167 B2 | 4/2010 | Kakivaya |
| 7,730,220 B2* | 6/2010 | Hasha et al. ............. 709/251 |
| 7,778,972 B1 | 8/2010 | Cormie |
| 7,805,407 B1 | 9/2010 | Verbeke et al. |
| 7,958,262 B2 | 6/2011 | Hasha |
| 7,984,137 B2 | 7/2011 | O'Toole et al. |
| 8,014,321 B2* | 9/2011 | Kakivaya et al. ............. 370/258 |
| 8,095,600 B2* | 1/2012 | Hasha et al. ............. 709/206 |
| 2002/0059425 A1 | 5/2002 | Belfiore |
| 2002/0085506 A1 | 7/2002 | Hundscheidt |
| 2002/0128995 A1 | 9/2002 | Muntz et al. |
| 2002/0129086 A1 | 9/2002 | Garcia-Luna-Aceves |
| 2002/0150094 A1 | 10/2002 | Cheng |
| 2002/0150145 A1 | 10/2002 | Alriksson |
| 2002/0184357 A1 | 12/2002 | Traversat |
| 2003/0009754 A1 | 1/2003 | Rowley et al. |
| 2003/0055892 A1 | 3/2003 | Huitema |
| 2003/0067871 A1 | 4/2003 | Busi |
| 2003/0108050 A1 | 6/2003 | Black et al. |
| 2003/0110408 A1 | 6/2003 | Wells |
| 2003/0131246 A1 | 7/2003 | Reeves et al. |
| 2003/0145086 A1 | 7/2003 | O'Reilly |
| 2003/0152098 A1 | 8/2003 | Zhu |
| 2003/0165140 A1 | 9/2003 | Tang |
| 2003/0182444 A1 | 9/2003 | Pedone |
| 2003/0220993 A1 | 11/2003 | Blizniak et al. |
| 2004/0054807 A1 | 3/2004 | Harvey |
| 2004/0064511 A1 | 4/2004 | Abdel-Aziz |
| 2004/0064548 A1 | 4/2004 | Adams et al. |
| 2004/0066741 A1 | 4/2004 | Dinker |
| 2004/0098502 A1 | 5/2004 | Xu et al. |
| 2004/0111651 A1 | 6/2004 | Mukherjee |
| 2004/0122927 A1 | 6/2004 | Muehl |
| 2004/0139150 A1 | 7/2004 | McCanne |
| 2004/0215795 A1 | 10/2004 | Poyhonen |
| 2004/0218536 A1 | 11/2004 | Yasukawa |
| 2004/0236945 A1 | 11/2004 | Risan et al. |
| 2005/0021725 A1 | 1/2005 | Lobbert |
| 2005/0031119 A1 | 2/2005 | Ding |
| 2005/0050320 A1 | 3/2005 | Wassmann et al. |
| 2005/0091399 A1 | 4/2005 | Candan |
| 2005/0100036 A1 | 5/2005 | Davis |
| 2005/0108481 A1 | 5/2005 | Iyengar |
| 2005/0111352 A1 | 5/2005 | Ho |
| 2005/0114291 A1 | 5/2005 | Becker-Szendy |
| 2005/0138173 A1 | 6/2005 | Ha |
| 2005/0152318 A1 | 7/2005 | Elbatt |
| 2005/0187946 A1 | 8/2005 | Zhang |
| 2005/0220106 A1 | 10/2005 | Raverdy |
| 2005/0276216 A1 | 12/2005 | Vasseur |
| 2006/0015507 A1 | 1/2006 | Butterworth |
| 2006/0039371 A1 | 2/2006 | Castro |
| 2006/0087990 A1* | 4/2006 | Kakivaya et al. ............. 370/299 |
| 2006/0090003 A1* | 4/2006 | Kakivaya et al. ............. 709/238 |
| 2006/0106940 A1 | 5/2006 | Jagannathan |
| 2006/0155781 A1 | 7/2006 | MacCormick |
| 2006/0182034 A1 | 8/2006 | Klinker et al. |
| 2006/0282505 A1 | 12/2006 | Hasha |
| 2006/0282547 A1 | 12/2006 | Hasha |
| 2007/0002774 A1 | 1/2007 | Hasha |
| 2007/0016663 A1 | 1/2007 | Weis |
| 2007/0053285 A1 | 3/2007 | Beer |
| 2007/0183460 A1 | 8/2007 | Enders |
| 2007/0204061 A1 | 8/2007 | Chen |
| 2007/0214194 A1 | 9/2007 | Reuter |
| 2007/0271385 A1 | 11/2007 | Davis et al. |
| 2008/0069124 A1 | 3/2008 | Patrick |
| 2008/0288646 A1 | 11/2008 | Hasha |
| 2008/0288659 A1 | 11/2008 | Hasha |
| 2009/0268677 A1 | 10/2009 | Chou |
| 2009/0319684 A1 | 12/2009 | Kakivaya |
| 2010/0046399 A1 | 2/2010 | Kakivaya |
| 2010/0262717 A1 | 10/2010 | Critchley |
| 2011/0082928 A1 | 4/2011 | Hasha |
| 2011/0238841 A1 | 9/2011 | Kakivaya |
| 2012/0036237 A1 | 2/2012 | Hasha |

FOREIGN PATENT DOCUMENTS

| | | |
|---|---|---|
| EP | 1643730 | 4/2006 |
| EP | 1650911 | 4/2006 |
| JP | 2004-266796 | 9/2004 |
| JP | 2005-323346 | 11/2005 |

OTHER PUBLICATIONS

Notice of Allowance dated Sep. 14, 2011 cited in U.S. Appl. No. 11/428,133.

Office Action dated Dec. 22, 2011 cited in U.S. Appl. No. 13/221,635.

Office Action dated Mar. 7, 2012 cited in U.S. Appl. No. 13/155,098.

Notice of Allowance dated Jul. 10, 2012 cited in U.S. Appl. No. 13/155,098

Chord: A scalable Peer-to-peer Lookup Protocol for Internet Applications Ion Stoica, Robert Morris, David Liben-Nowell, David R. Karger, M. Frans Kaashoek, Frank Dabek, Harris Balakrishnan, Member, IEEE/ACM Transactions on Networking, vol. 11, No. 1, Feb. 2003.

Pastry: Scalable, decentralized object location and routing for large-scale peer-to-peer systems Anthony Rowstron and Peter Druschel, 2001.

Kademlia: A Peer-to-peer Information System Based on the XOR Metric Peter Maymounkov and David Mazieres, p. 1-15, 2002.

Exploiting network proximity in peer-to-peer overlay networks Miguel Castro, Peter Druschel, Y. Charlie Hu, Anthony Rowstron, Technical Report MSR-TR-2002-82 pp. 1-15, 2002.

A Scalable Content-Addressable Network Sylvia Ratnasamy, Paul Francis, Mark Handley, Richard Karp, Scott Shenker p. 1-17 Written by Vladimir Eske. Saarland University, Department of Computer Science, 2001.

A Scalable Content-Addressable Network, Sylvia Ratnasamy, et al, Copyright 2001, Aug. 27-31, 2001, San Diego, CA p. 161-172.

Tapestry: An Infrastructure for Fault-tolerant Wide-area Location and Routing, Ben Y. Zhao, et al., Computer Science Division, p. 1-27.

Conti, Marco, et al. "Towards Scalable P2P Computing for Mobile Ad Hoc Networks" Pervasive Computing and Communications Workshops, 2004. Proceedings of the Second IEEE Annual Conference on, Piscataway, NJ, Mar. 14, 2002, pp. 109-113.

Ganesan, Prasanna, et al. Canon in Go Major: Designing DHT's with Hierarchical Structure, Distributed Computing Systems, 2004 Proceedings, 24th International Conference on Hachioji, Tokyo, Japan, Mar. 24, 2004, pp. 263-272.

Cai, Min, et al. "MAAN: A Multi-Attributed Addressable Network for Grid Information Services" Grid Computing, 2003, Proceedings, Fourth International Workshop on Nov. 17, 2003, Piscataway, NJ, pp. 184-191.

Liu, Huaiyu, et al. "Neighbor Table Construction and Update in a Dynamic Peer-to-Peer Network" Proceedings of the 23rd International Conference on Distributed Computing Systems, ICDCS 2003. Providence, RI, May 19-22, vol. Conf. 23, May 19, 2003, pp. 509-518.

Seshadri, Mukund, "A Scalable Architecture for Broadcast Federation", http://www.cs.berkeley.edu/~mukunds/ms/citris/ms-report.pdf, Dec. 2002.

Krumm, John, et al., "The NearMe Wireless Proximity Server", Ubi Comp 2004. The Sixth International Conference on Ubiquitous Computing, Sep. 7-10, 2004, Nottingham, England, http://research.microsoft.com/users/jckrumm/Publications%202004/nearme%20distribute.pdf.

Waldo, Jim, Sun Microsystems, Inc. "Constructing Ad Hoc Networks", pp. 9-20 2001 IEEE.

Berger Stefan, et al., "Towards Pluggable Discovery Frameworks for Mobile and Pervasive Applications", 12 pages 2004 IEEE.

Pertselakis, M., et al., "An Intelligent Agent based approach for Service Discovery in Wireless AD hoc Networks", 2002.

Gandhi, Rajiv, et al., "Minimizing Broadcast Latency and Redundancy in Ad Hoc Networks", 2003, pp. 222-232.

Li, Ning, et al., "BLMST: A Scalable, Power-Efficient Broadcast Algorithm for Wireless Networks", IEEE Computer Society, 2004.

Chen et al., "Enforcing Routing Consistency in Structured Peer to Peer Overlays: Should We and Could We?", 6 pages. 2006.

Gupta, Manish, "TPC-W E-Commerce Benchmark Using Javlin/ObjectStore", 6 pages, 2001.

Mendonga et al., "The Hierarchical Ring Protocol: An Efficient Scheme for Reading Replicated Data", Date: 1993, 33 pages.

Naef et al., "The blue-c Distributed Scene Graph", dated: 2003.

Consistancy-based Routing in Overlay Networks (1 page) http://www.actpress.com/Paperinfo.aspx?PaperID=16686.

Enforcing Routing Consistancy in Structured Peer to Peer Overlays: Should We and Could We? (6 pages) http://research.microsoft.com/asia/dload_files/group/system/2006/Chen-Cons06.pdf.

On the Consistancy of DHT-Based Routing (17 pages) http://www.eecs.berkeley.edu/~kjk/consistancy-rep.pdf.

Skonnard, Aaron, "Learn the ABCs of Programming Windows Communication Foundation" MSDN Magazine The Microsoft Journal for Developers, Feb. 2006, pp. 1-14.

Sun Microsystems, "Federeated Naming Service Programming Guide", Sep. 2002, 110 pages.

Triantafillou, "Planes: The Next Step in Peer-to-Peer Network Architectures", Oct. 2, 2003, retrieved from http://www.celd.upatras.gr/faculty/peter/papers/ on Jan. 3, 2011.

Harvey et al., "SkipNet: A Scalable Overlay Network with Practical Locality Properties", Mar. 2003, Retrieved from http://research.microsoft.com/en-us/um/people/ssaroiu/publications/usits/2003/abstract.html on Jul. 2009.

Pietzuch et al., "Hermes: A Distributed Event-Based Middleware Architecture", Jul. 11, 2002, Retrieved from http://ieee.org.xpls/abs_all.jsp?arnumber=1030837 on Jul. 6, 2009.

"NoN-Greedy Routing Algorithms Are Optimal or Know thy Neighbor's Neighbor", Dec. 8, 2003, retrieved from http://citeseerx.ist.psu.edu/viewdoc/summary?doi=10.1.1.4.4688 on Aug. 12, 2010.

Tang; "GoCast: Gossip-Enhanced Overlay Multicast for Fast and Dependable Group Communication"—2005—pp. 1-10—http://www.cogsci.rochester.edut~sarrmor/publications/GoCast-DSN05.pdf.

Choi; "D2HT: Directory Federation Using DHT to Support Open Scalability in Ubiquitous Network"—2005—pp. 1-5—http://ieeexplore.ieee.org/ie15/9593/30313/01392843.pdf?isNumber=.

Baldi; "A comparison of ring and tree embedding for real-time group multicast"—Jun. 2003—pp. 451-464—http://delivery.acm.org/10.1145/880000/874106/p451-baldi.pdf?key1=874106&key2=4662566811&coll=GUIDE&d1=GUIDE&CFID=31221611&CFTOKEN=81646820.

Garcia-Luna-Aceves; "A Multicast Routing Protocol for Ad-Hoc Networks"—1999—pp. 1-9—http://citeseer.ist.psu.edu/cache/papers/cs/11652/http:zSzzSzwww.cse.ucsc.eduzSzresearchzSzc-crgzSzpublicationszSzmadruga.infocom99.pdf/garcia-luna-aceves99multicast.pdf.

Castro; "Proximity neighbor selection in tree-based structured peer-to-peer overlays"—2003—pp. 1-11—http://project-iris.com/irisbib/papers/proximity:mstr03/paper.pdf.

Garces-Erice; "Multi+: Building Topology-Aware Overlay Multicast Trees"—2007—pp. 1-3—http://www.springerlink.com/content/dtbujud595f4ae6f/.

Wepiwe, Giscard, et al., A concentric Multi-ring Overlay for Highly Reliable P2P Networks, Proceedings of the 2005 Fourth IEEE International Symposium on Network Computing and Applications (NCA'05), 8 pages.

Cohen, Reuven, et al., "A New Protocol for Route Discovery in Multiple-Ring Networks: Part II—Multicast, Recovery and High-Speed Processing", IEEE Transactions on Communications, vol. 42, No. 2/3/4, Feb./Mar./Apr. 1994, pp. 1112-1119.

Wang, Guojun, et al., "A Proxy-based Mobile Group Membership Protocol for Large Scale and Highly Dynamic Groups", Jun. 2006, IEEE, pp. 1897-1902.

U.S. Appl. No. 10/971,451, mail date Jun. 8, 2009, Office Action.

U.S. Appl. No. 11/016,446, mail date Sep. 25, 2007, Notice of Allowance.

U.S. Appl. No. 11/016,446, mail date Nov. 14, 2007, Notice of Allowance.

U.S. Appl. No. 11/220,756, mail date Apr. 2, 2009, Office Action.

U.S. Appl. No. 11/015,460, filed Feb. 5, 2009, Office Action.

U.S. Appl. No. 11/015,460, filed Jun. 15, 2009, Office Action.

U.S. Appl. No. 11/015,460, filed Sep. 14, 2009, Notice of Allowance.

U.S. Appl. No. 11/016,422, filed Oct. 1, 2008, Notice of Allowance.

U.S. Appl. No. 11/549,332, filed May 7, 2009, Office Action.

U.S. Appl. No. 11/752,198, filed Aug. 21, 2009, Office Action.

U.S. Appl. No. 11/428,146, filed Mar. 16, 2009, Office Action.

U.S. Appl. No. 11/428,146, filed Aug. 17, 2009, Office Action.

U.S. Appl. No. 11/465,316, filed Jun. 24, 2009, Office Action.

U.S. Appl. No. 11/428,133, filed Feb. 6, 2009, Office Action.

U.S. Appl. No. 11/428,133, filed Jul. 13, 2009, Office Action.

U.S. Appl. No. 11/549,332, filed Dec. 4, 2009, Notice of Allowance.

U.S. Appl. No. 11/465,316, filed Dec. 23, 2009, Notice of Allowance.

U.S. Appl. No. 11/220,756, filed Jan. 14, 2010, Office Action.

U.S. Appl. No. 11/752,198, filed Feb. 17, 2010, Office Action.

U.S. Appl. No. 10/971,451, filed Feb. 22, 2010, Office Action.

U.S. Appl. No. 11/220,756, filed Jul. 20, 2010, Office Action.

U.S. Appl. No. 10/971,451, filed Jul. 20, 2010, Office Action.

U.S. Appl. No. 11/428,146, filed Aug. 16, 2010, Office Action.

U.S. Appl. No. 11/428,133, filed Aug. 19, 2010, Office Action.

U.S. Appl. No. 12/611,825, filed Oct. 8, 2010, Office Action.

U.S. Appl. No. 11/936,556, filed Jul. 23, 2010, Office Action.

U.S. Appl. No. 11/220,756, filed Nov. 23, 2010, Office Action.

U.S. Appl. No. 11/752,198, filed Dec. 27, 2010, Notice of Allowance.

U.S. Appl. No. 10/971,451, filed Dec. 30, 2010, Office Action.

U.S. Appl. No. 11/428,133, filed Jan. 7, 2011, Office Action.

U.S. Appl. No. 11/220,756, filed Mar. 17, 2011, Notice of Allowance.

U.S. Appl. No. 10/971,451, filed Mar. 22, 2011, Office Action.

U.S. Appl. No. 12/611,825, filed Mar. 23, 2011, Office Action.

U.S. Appl. No. 11/428,146, filed May 9, 2011, Office Action.

U.S. Appl. No. 11/428,133, filed May 9, 2011, Office Action.

U.S. Appl. No. 11/220,756, filed May 10, 2011, Notice of Allowance.

Office Action dated Aug. 10, 2012 cited in U.S. Appl. No. 12/821,002.

Pierson, Nick, Microsoft Windows Server 2003 R2, "Overview of Active Directory Federation Services in Windows Server 2003 R2", Oct. 2005, 20 pages.

Ahlgren, Bengt, et al., "A Node Identity Internetworking Architecture", Mar. 29, 2006.

Cluster Resources, "Moab Adaptive Computing Suite", 2010, 4 pages.

Narendula, Rammohan, et al., "Towards Access Control Aware P2P Data Management Systems", ACM Internation Conference Proceeding Series; vol. 360, Proceedings of the 2009 EDBT/ICDT Workshops, 2009, 8 pages.

U.S. Appl. No. 11/936,556, filed Jun. 24, 2011, Notice of Allowance.

Notice of Allowance dated Nov. 7, 2012 cited in U.S. Appl. No. 12/491,841.

U.S. Appl. No. 12/491,841, filed May 11, 2012, Office Action.

Notice of Allowance dated Jul. 23, 2012 cited in U.S. Appl. No. 13/221,635.

Office Action dated Jan. 23, 2013 cited in U.S. Appl. No. 12/821,002.

* cited by examiner

RENDEZVOUSING RESOURCE REQUESTS WITH CORRESPONDING RESOURCES

CROSS-REFERENCE TO RELATED APPLICATIONS

This application is a continuation of U.S. patent application Ser. No. 11/220,756, filed Sep. 7, 2005, and entitled "Rendezvousing Resource Requests With Corresponding Resources," which is a continuation of U.S. patent application Ser. No. 10/971,451, filed Oct. 22, 2004, and entitled "Rendezvousing Resource Requests With Corresponding Resources." The contents of each of the foregoing applications are herein incorporated by reference in their entirety.

BACKGROUND OF THE INVENTION

1. The Field of the Invention

The present invention relates to accessing resources and, more particularly, to rendezvousing resource requests with corresponding resources.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include electronic communication between a number of computer systems and/or other electronic devices via wired and/or wireless computer networks.

However, to utilize a network resource to perform a computerized task, a computer system must have some way to identify and access the network resource. Accordingly, resources are typically assigned unique identifiers, for example, network addresses, that uniquely identify resources and can be used to distinguish one resource from other resources. Thus, a computer system that desires to utilize a resource can connect to the resource using the network address that corresponds to the resource. However, accessing a network resource can be difficult if a computer system has no prior knowledge of a network address for a network resource. For example, a computer system can not print a document at a network printer unless the computer system (or another networked computer system) knows the network address of the network printer.

Accordingly, various mechanisms (e.g., Domain Name System ("DNS"), Active Directory ("AD"), Distributed File Systems ("DFS")) have been developed for computer systems to identify (and access) previous unknown resources. However, due to the quantity and diversity of resources (e.g., devices and services) that are accessible via different computer networks, developers are often required to develop applications that implement a variety of different resource identification and access mechanisms. Each different mechanism may have different coding requirements and may not provide a developer with all the functionality that is needed in an application.

For example, although DNS has a distributed administration architecture (i.e., centralized management is not required), DNS is not sufficiently dynamic, not self-organizing, supports a weak data and query model, and has a fixed set of roots. On the other hand, AD is sufficiently dynamic but requires centralized administration. Further, aspects of different mechanisms may not be compatible with one another. For example, a resource identified using DNS may not be compatible with DFS routing protocols. Thus, a developer may be forced to choose the most suitable mechanism and forgo the advantages of other mechanisms.

Mechanisms for identifying resources can be particularly problematic in peer-to-peer networks. DNS provides a lookup service, with host names as keys and IP addresses as values, that relies on a set of special root servers to implement lookup requests. Further, DNS requires management of information (NS records) for allowing clients to navigate the name server hierarchy. Thus, a resource must be entered into DNS before the resource can be identified on a network. On larger scale networks where nodes frequently connect and disconnect form the network relying on entry of information is not always practical. Additionally, DNS is specialized to the task of find hosts or services and is not generally applicable to other types of resources.

Accordingly, other mechanisms for resource identification and access have been developed to attempt to address these shortcomings. A number of mechanisms include distributed lookup protocols that are more scalable than DNS. These mechanisms use various node arrangements and routing algorithms to route requests to corresponding resources and to store information for lookup.

At least one of these mechanisms utilizes local multi-level neighbor maps at each node in a network to route messages to a destination node. This essentially results in an architecture where each node is a "root node" of a corresponding tree of nodes (the nodes in its neighbor map). Messages are incrementally routed to a destination ID digit by digit (e.g., *6=>46=>, *346=>2346, where *s represent wildcards). The routing efficiency of these types of mechanisms is $O(\log N)$ routing hops and require nodes to maintain a routing table of $O(\log N)$ size.

At least one other of these mechanisms assigns nodes a unique ID that is taken from a linear ring of numbers. Nodes maintain routing tables that contain pointers to their immediate successor node (according to ID value) and to those nodes whose ID values are the closest successor of the value $ID+2^L$. The routing efficiency of these types of mechanisms is also $O(\log N)$ routing hops and require nodes to maintain a routing table of $O(\log N)$ size.

At least one further mechanisms requires $O(\log N^{1/d})$ routing hops and requires nodes to maintain a routing table of $O(D)$ size. Thus, the routing efficiency of all of these mechanisms depends, at least in part, on the number of nodes in the system.

Further, since IDs (for at least some of the mechanisms) can be uniformly distributed around a ring, there is always some possibility that routing between nodes on the ring will result in some inefficiency. For example, routing hops can cross vast geographic distances, cross more expensive links, or pass through insecure domains, etc. Additionally, when message routing involves multiple hops, there is some chance that such events will occur multiple times. Unfortunately, these mechanisms do not take into account the proximity of nodes (physical or otherwise) with respect one another. For example, depending on node distribution on a ring, routing a message from New York to Boston could involve routing the message from New York, to London, to Atlanta, to Tokyo, and then to Boston.

Accordingly, at least one other more recent mechanism takes proximity into account by defining proximity as a single scalar proximity metric (e.g., IP routing hops or geographic distance). These mechanisms use the notion of proximity-based choice of routing table entries. Since there are many "correct" node candidates for each routing table entry, these mechanisms attempt to select a proximally close node from among the candidate nodes. For these mechanisms can provide a function that allows each node to determine the "distance" of a node with a given IP address to itself. Messages are routed between nodes in closer proximity to make progress towards a destination before routing to a node that is further away. Thus, some resources can be conserved and routing is more efficient.

Unfortunately, these existing mechanisms typically do not provide for, among other things, symmetric relationships between nodes (i.e., if a first node considers a second node to be its partner, the second node considers the first node as a partner as well), routing messages in both directions (clockwise and counterclockwise) on a ring, partitioning linked lists of nodes based on a plurality of proximity metrics, and routing messages based on a plurality of proximity metrics proximity. Therefore systems, methods, computer program products that utilize these mechanisms to rendezvous resource requests with a corresponding resource would be advantageous.

BRIEF SUMMARY OF THE INVENTION

The foregoing problems with the prior state of the art are overcome by the principles of the present invention, which are directed towards methods, systems, and computer program products for rendezvousing resource requests with corresponding resources. In some embodiments, the nodes of a federation infrastructure are partitioned. A sorted linked list containing node IDs that have been assigned to nodes in the federation infrastructure is accessed. Proximity categories that represent a plurality of different proximity criterion for partitioning the sorted link list are accessed. The sorted linked list is partitioned into one or more first sub lists based on a first proximity criterion, each of the one or more first sub lists containing at least a subset of the node IDs from the sorted linked list. A first sub list, selected from among the one or more first sub lists, is partitioned in to one or more second sub lists based on a second proximity criterion, each of the one or more second sub lists containing at least a subset of node IDs contained in the first sub list.

In other embodiments, for example as depicted in FIG. 3, a node routing table is populated. An immediate predecessor node is inserted into the routing table. An immediate successor node is inserted into the routing table. Appropriate neighborhood node identifiers are inserted into the routing table, the neighborhood nodes identified from the sorted linked list in both the first direction and in a second opposite direction based on a predetermined or estimated neighborhood range and neighborhood size. Appropriate routing nodes identifiers are inserted into the routing table, the routing nodes identified from the sorted linked list in both the first and second directions based on the number base and field size of the ID space for the federation infrastructure, the routing nodes representing a logarithmic index of the sorted link list in both the first and second directions.

In yet other embodiments, a node routing table can be populated taking proximity criteria in to account. A predecessor node for each hierarchically partitioned routing ring the current node participates in is inserted into a routing table, each hierarchically partitioned routing ring being partitioned in accordance with corresponding proximity criteria and containing at least subsets of the bi-directional linked list of a parent ring. A successor node for each hierarchically partitioned routing ring the current node participates is inserted into the routing table. Appropriate neighborhood nodes for each hierarchically partitioned routing ring the current node participates in are inserted into the routing table. Appropriate routing nodes for each hierarchically partitioned routing ring the current node participates in are inserted into the routing table.

In further other embodiments, a message is routed, potentially based on one or more proximity criteria defining a corresponding one or more classes of nodes, towards a destination node. A receiving node receives a message along with a destination number indicating a destination node and optionally one or more proximity criteria. The receiving node, potentially among nodes in a current class of nodes, determines it is at least one of numerically further from the destination number than a corresponding predecessor node and numerically further from the destination number than a corresponding successor node. It is determined that the destination is not in a neighborhood set of nodes, potentially among nodes in the current class of nodes, corresponding to the receiving node.

An intermediate node from a routing table corresponding to the receiving node is identified, the intermediate node being numerically closer to the destination number than other routing nodes in the corresponding routing table. The message is sent to the intermediate node. The intermediate node can continue routing the message. The message eventually reaches the destination node when a node that receives the message is numerically closer to the destination number than either its successor or predecessor nodes. In embodiments that route based on one or more proximity criteria, this numerical closeness may be with respect to nodes in a selected class of nodes.

Thus, routing a message based on proximity criteria includes routing to a destination node (ID) by progressively moving closer to the destination node within a given proximal ring (class of nodes) until no further progress can be made by routing within that ring. Determining that no further progress can be made occurs when the destination number lies between the current node's ID and its successor or predecessor nodes' IDs. At this point, the current node starts routing via its partner nodes in the next larger proximal ring in which it participates. This process of progressively moving towards the destination node by climbing along the partitioning path towards the root ring terminates when the destination node is reached.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The foregoing problems with the prior state of the art are overcome by the principles of the present invention, which are directed towards methods, systems, and computer program products for rendezvousing resource requests with corresponding resources. In some embodiments, the nodes of a federation infrastructure are partitioned. A sorted linked list containing node IDs that have been assigned to nodes in the federation infrastructure is accessed. Proximity categories that represent a plurality of different proximity criterion for partitioning the sorted link list are accessed. The sorted linked list is partitioned into one or more first sub lists based on a first proximity criterion, each of the one or more first sub lists containing at least a subset of the node IDs from the sorted linked list. A first sub list, selected from among the one or more first sub lists, is partitioned in to one or more second sub lists based on a second proximity criterion, each of the one or more second sub lists containing at least a subset of node IDs contained in the first sub list.

Figure 3:
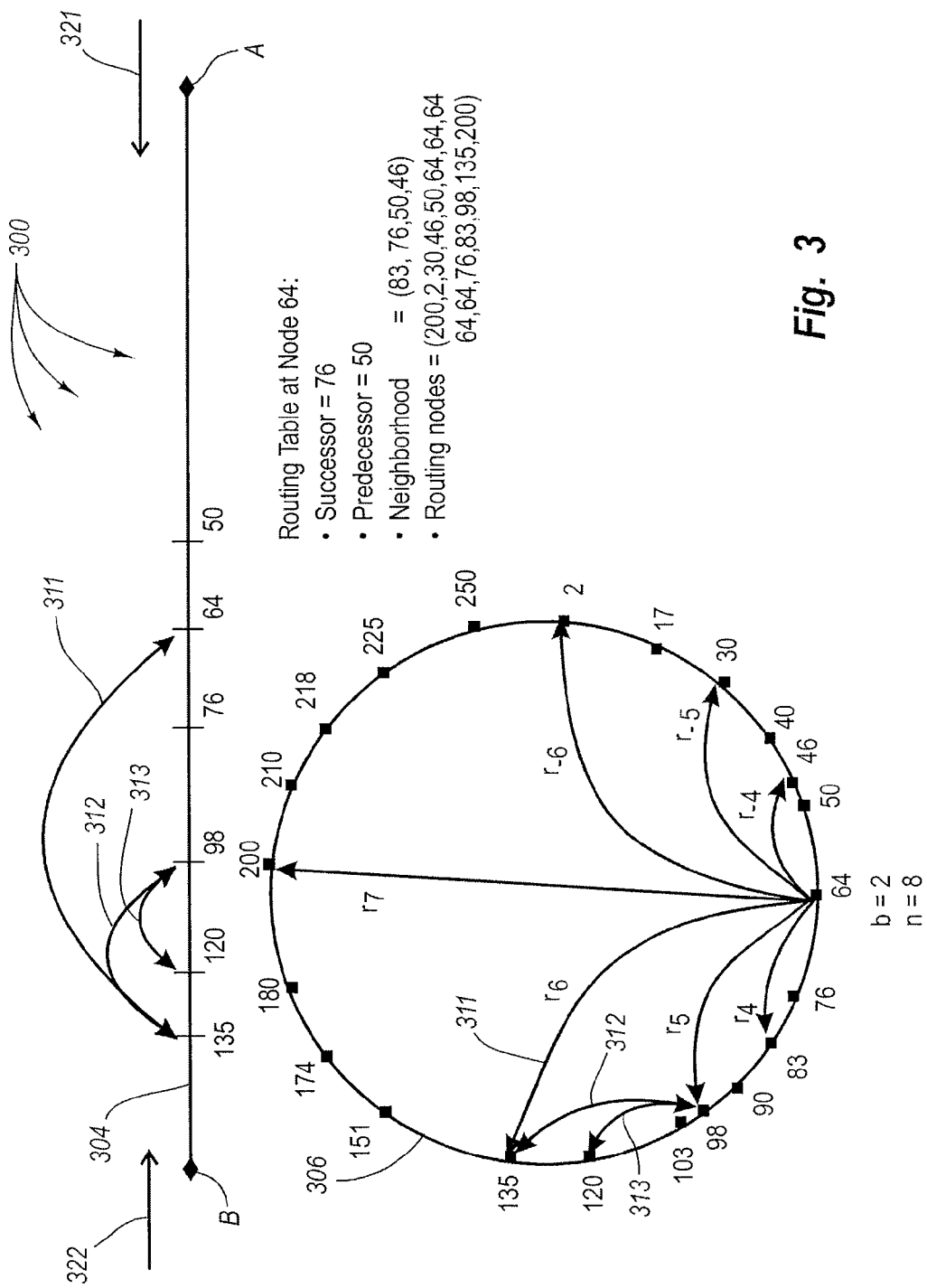
FIG. 3 illustrates an example binary relationship between nodes in a federation infrastructure in the form of a sorted list and corresponding ring.

In other embodiments, for example as depicted in FIG. 3, a node routing table is populated. An immediate predecessor node is inserted into the routing table. An immediate successor node is inserted into the routing table. Appropriate neighborhood node identifiers are inserted into the routing table, the neighborhood nodes identified from the sorted linked list in both the first direction and in a second opposite direction based on a predetermined or estimated neighborhood range and neighborhood size. Appropriate routing nodes identifiers are inserted into the routing table, the routing nodes identified from the sorted linked list in both the first and second directions based on the number base and field size of the ID space for the federation infrastructure, the routing nodes representing a logarithmic index of the sorted link list in both the first and second directions.

In yet other embodiments, a node routing table can be populated taking proximity criteria in to account. A predecessor node for each hierarchically partitioned routing ring the current node participates in is inserted into a routing table, each hierarchically partitioned routing ring being partitioned in accordance with corresponding proximity criteria and containing at least subsets of the bi-directional linked list of a parent ring. A successor node for each hierarchically partitioned routing ring the current node participates is inserted into the routing table. Appropriate neighborhood nodes for each hierarchically partitioned routing ring the current node participates in are inserted into the routing table. Appropriate routing nodes for each hierarchically partitioned routing ring the current node participates in are inserted into the routing table.

In further other embodiments, a message is routed, potentially based on one or more proximity criteria defining a corresponding one or more classes of nodes, towards a destination node. A receiving node receives a message along with a destination number indicating a destination node and optionally one or more proximity criteria. The receiving node, potentially among nodes in a current class of nodes, determines it is numerically further from the destination number than a corresponding predecessor node and numerically further from the destination number than a corresponding successor node. It is determined that the destination is not in a neighborhood set of nodes, potentially among nodes in the current class of nodes, corresponding to the receiving node.

An intermediate node from a routing table corresponding to the receiving node is identified, the intermediate node being numerically closer to the destination number than other routing nodes in the corresponding routing table. The message is sent to the intermediate node. The intermediate node can continue routing the message. The message eventually reaches the destination node when a node that receives the message is numerically closer to the destination number than either its successor or predecessor nodes. In embodiments that route based on one or more proximity criteria this numerical closeness may be with respect to nodes in a selected class of nodes.

Thus, routing a message based on proximity criteria includes routing to a destination node (ID) by progressively moving closer to the destination node within a given proximal ring (class of nodes) until no further progress can be made by routing within that ring. Determining that no further progress can be made occurs when the destination number lies between the current node's ID and its successor or predecessor nodes' IDs. At this point, the current node starts routing via its partner nodes in the next larger proximal ring in which it participates. This process of progressively moving towards the destination node by climbing along the partitioning path towards the root ring terminates when the destination node is reached.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code. In some embodiments, hardware modules, such as, for example, special purpose integrated circuits or Gate-arrays are optimized to implement the principles of the present invention.

In this description and in the following claims, a "node" is defined as one or more software modules, one or more hardware modules, or combinations thereof, that work together to perform operations on electronic data. For example, the definition of a node includes the hardware components of a personal computer, as well as software modules, such as the operating system of the personal computer. The physical layout of the modules is not important. A node can include one or more computers coupled via a network. Likewise, a node can include a single physical device (such as a mobile phone or Personal Digital Assistant "PDA") where internal modules (such as a memory and processor) work together to perform operations on electronic data. Further, a node can include special purpose hardware, such as, for example, a router that includes special purpose integrated circuits.

Those skilled in the art will appreciate that the invention may be practiced in network computing environments with many types of node configurations, including, personal computers, laptop computers, hand-held devices, multi-processor systems, microprocessor-based or programmable consumer electronics, network PCs, minicomputers, mainframe computers, mobile telephones, PDAs, pagers, routers, gateways, brokers, proxies, firewalls, redirectors, network address translators, and the like. The invention may also be practiced in distributed system environments where local and remote nodes, which are linked (either by hardwired data links, wireless data links, or by a combination of hardwired and wireless data links) through a network, both perform tasks. In a distributed system environment, program modules may be located in both local and remote memory storage devices.

Federation Architecture

Figure 1:
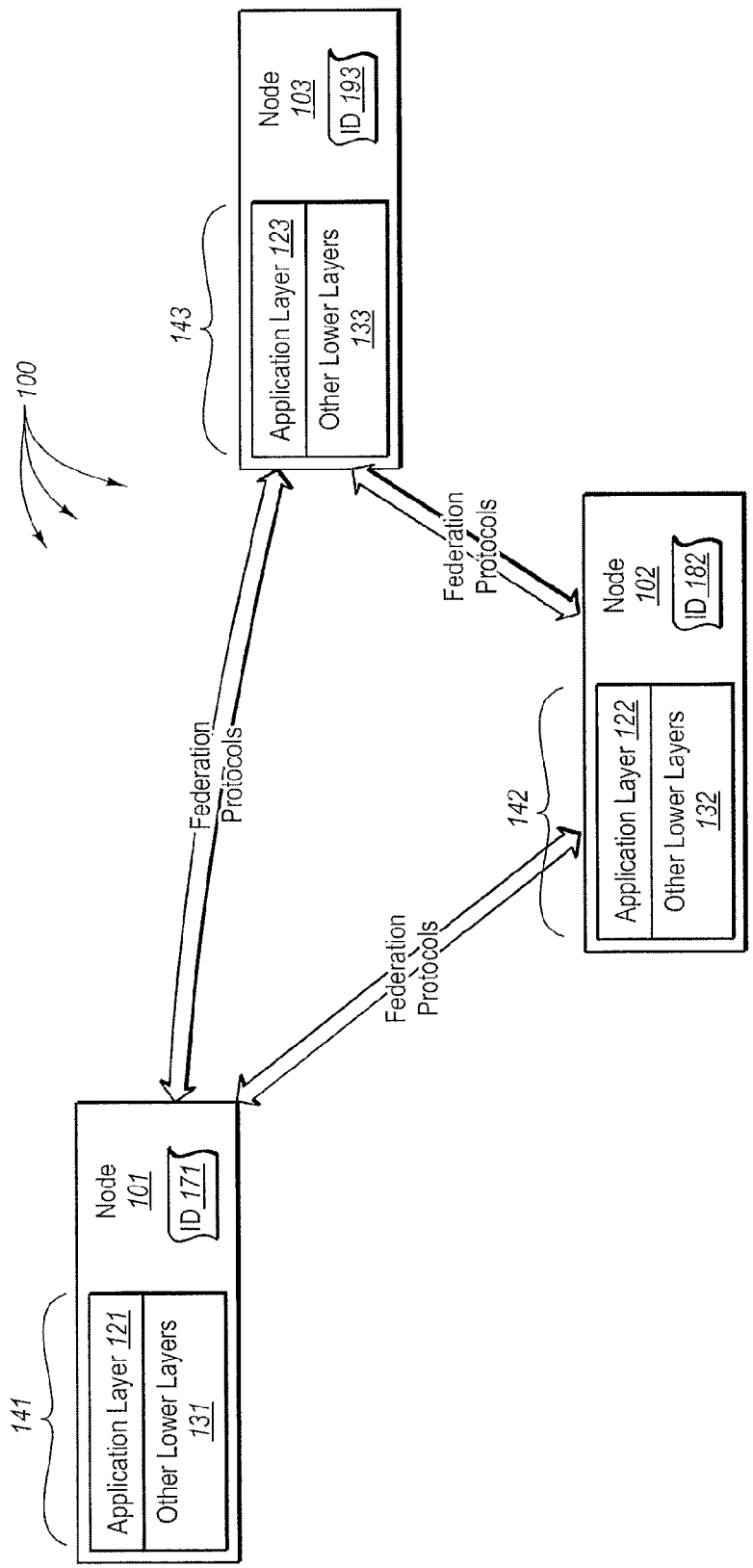
FIG. 1 illustrates an example of a federation infrastructure.

FIG. 1 illustrates an example of a federation infrastructure 100. The federation infrastructure 100 includes nodes 101, 102, 103, that can form different types of federating partnerships. For example, nodes 101, 102, 103 can be federated among one another as peers without a root node. Each of nodes 101, 102, and 103 has a corresponding ID 171, 182, and 193 respectively.

Generally, the nodes 101, 102, 103, can utilize federation protocols to form partnerships and exchange information (e.g., state information related to interactions with other nodes). The formation of partnerships and exchange of information facilitates more efficient and reliable access to resources. Other intermediary nodes (not shown) can exist between nodes 101, 102, and 103 (e.g., nodes having IDs between 171 and 193). Thus, a message routed, for example, between node 101 and node 103, can be pass through one or more of the other intermediary nodes.

Nodes in federation infrastructure 100 (including other intermediary nodes) can include corresponding rendezvous protocol stacks. For example, nodes 101, 102, and 103 include corresponding rendezvous protocol stacks 141, 142, and 143 respectively. Each of the protocols stacks 141, 142, and 143 includes an application layer (e.g., application layers 121, 122, and 123) and other lower layers (e.g., corresponding other lower layers 131, 132, and 133). Each layer in a rendezvous protocol stack is responsible for different functionality related to rendezvousing a resource request with a corresponding resource.

For example, other lower layers can include a channel layer, a routing layer, and a function layer. Generally, a channel layer is responsible for reliably transporting a message (e.g., using WS-ReliableMessaging and Simple Object Access Protocol ("SOAP")) from one endpoint to another (e.g., from node 101 to node 103). The channel layer is also responsible for processing incoming and outgoing reliable messaging headers and maintaining state related to reliable messaging sessions.

Generally, a routing layer is responsible for computing the next hop towards a destination. The routing layer is also responsible for processing incoming and outgoing addressing and routing message headers and maintaining routing state. Generally, a function layer is responsible for issuing and processing rendezvous protocol messages such as join and depart requests, pings, updates, and other messages, as well as generation of responses to these messages. The function layer processes request messages from the routing layer and sends back corresponding response messages, if any, to the originating node using the routing layer. The function layer also initiates request messages and utilizes the routing layer to have the requests messages delivered.

Generally, an application layer processes non-rendezvous protocol specific data delivered from the function layer (i.e., application messages). The function layer can access application data from the application layer and get and put application data in rendezvous protocol messages (e.g., pings and updates). That is, the function layer can cause application data to be piggybacked on rendezvous protocol messages and can cause the application data to be passed back to the application layer in receiving rendezvous protocol nodes. In some embodiments, application data is used to identify resources and resource interests. Thus, an application layer can include application specific logic and state that processes data received from and sent to the other lower layers for purposes of identifying resources and resource interests.

Federating Mechanisms

Nodes can federate using a variety of different mechanisms. A first federating mechanism includes peer nodes forwarding information to all other peer nodes. When a node is to join a federation infrastructure, the node utilizes a broadcast/multicast discovery protocol, such as, for example, WS-Discovery to announce its presence and issues a broadcast/multicast find to detect other nodes. The node then establishes a simple forwarding partnership with other nodes already present on the network and accepts new partnerships with newly joining nodes. Thereafter, the node simply forwards all application specific messages to all of its partner nodes.

A second federating mechanism includes peer nodes that most efficiently transmit application specific messages to their destination(s). When a new node is to join a federation infrastructure, the new node utilizes a broadcast/multicast discovery protocol, such as, for example, WS-Discovery to announce its presence and issues a broadcast/multicast find to detect other nodes that are part of the federation infrastructure. Upon detecting another node, the new node establishes a partnership with the other node. From the established partnership, the new node learns about the presence of other nodes already participating in federation infrastructure. It then establishes partnerships with these newly-learned nodes and accepts any new incoming partnership requests.

Both node arrivals/departures and registrations of interest in certain application specific messages are flooded through the federation infrastructure resulting in every node having global knowledge of other partner nodes and registrations of interest in application specific messages. With such global knowledge, any node can send application specific messages directly to the nodes that have expressed interest in the application specific message.

A third federating mechanism includes peer nodes indirectly forwarding all application specific messages to their destination/s. In this third mechanism, nodes are assigned identifiers (ID's), such as, for example, a 128-bit or 160-bit ID. The node responsible for a maintaining registration of interest in a given application specific message can be determined to be the one whose ID is closest to the one obtained by mapping (e.g., hashing) the destination identity (e.g. URI) of the application specific message to this 128-bit or 160-bit ID-space.

In this third mechanism, node arrivals and departures are flooded over the entire fabric. On the other hand, registrations of interest in certain application specific messages are forwarded to the nodes determined to be responsible for maintaining such registration information. For scalability, load balancing, and fault-tolerance, the node receiving registration of interest in certain application specific messages can reliably flood that registration information within its neighborhood set. The neighborhood set for a specified node can be determined to be the set of nodes having IDs within a predefined range on either side of the ID of specified node.

Similar to the second mechanism, a newly joining node utilizes a broadcast/multicast discovery protocol, such as, for example, WS-Discovery to announce its presence and issues a local broadcast/multi-cast find to detect a node that is already part of the federation infrastructure. The new node establishes a partnership with the discovered node and uses that partnership to learn about the presence of other new nodes participating in the federation infrastructure. The new node then establishes further partnerships with the newly discovered nodes and accepts any new incoming partnership requests. The new node accepts incoming registrations of interest in certain application layer specific resources from its partners for which it is responsible and may flood them over its neighborhood set. Thus, messages can generally be forwarded to their final destination via intermediary routing nodes (e.g., that a newly joining node has partnered with or that a partner node is aware of).

In response to receiving an incoming application specific message, the new node forwards the message to the partner node that may be responsible for maintaining the registration information for the destination specified in the message. Thus, when using this third mechanism, every node in the federation infrastructure has global knowledge of all other nodes but the registration information is efficiently partitioned among the nodes. Application specific messages are transmitted to their final destination via only the partner's nodes that may have the responsibility for maintaining registration information of interest in those application specific messages. Thus, indirection is accomplished by forwarding only to the partner node that has global knowledge of the registration information of interest for the message being processed. This is in contrast to the first mechanism where the indirection is accomplished by forwarding to all the partner nodes.

A fourth federating mechanism includes peer nodes that route messages to other peer nodes. This fourth mechanism differs from the third mechanism at least in that both node arrivals/departures and registrations of interest in certain application specific messages are all routed instead being flooded. Routing protocols are designed to guarantee rendezvous between application specific messages and the registration messages that express interest in those application specific messages.

Figure 2:
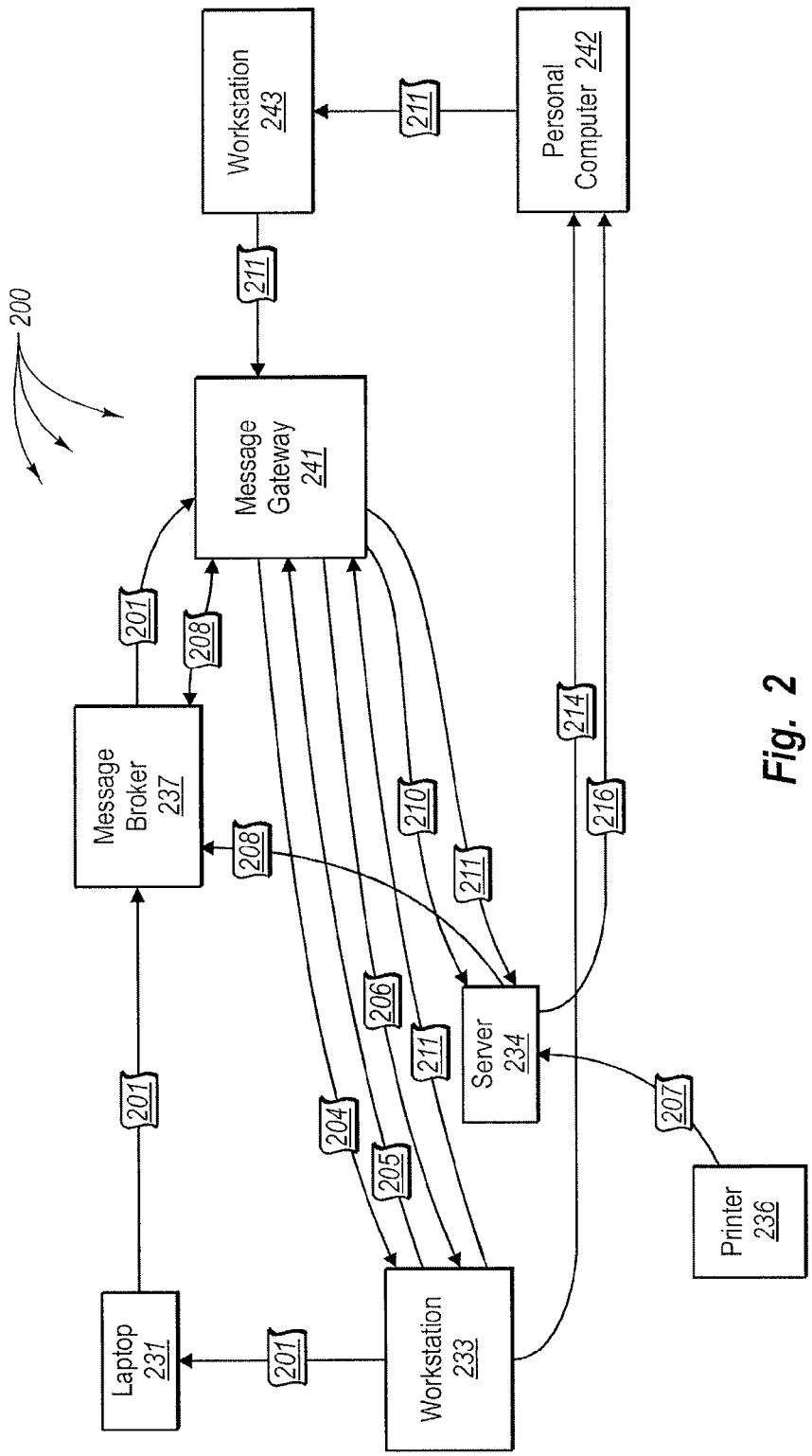
FIG. 2 illustrates an example of a computer architecture that facilitates routing request indirectly to partners.

FIG. 2 illustrates an example of a computer architecture 200 that facilitates routing requests indirectly to partners. Computer architecture 200 depicts different types of computer systems and devices potentially spread across multiple local discovery scopes participating in a federation infrastructure.

Workstation 233 can include a registered PnP provider instance. To inform its partners of the presence of this PnP provider instance, workstation 233 routes registration request 201 over the federation infrastructure. Registration request 201 is initially forwarded to laptop 231, which in turn forwards registration request 201 to message broker 237, which in turn forwards registration request 201 to message gateway 241. Message gateway 241 saves the registration information registration request 201 in its database and returns success message 204 to workstation 233.

Subsequently, another registered provider instance, this time that of running services, comes alive within the workstation 233. This time the node is aware that message gateway 241 is responsible for registrations and forwards registration request 205 to message gateway 241 directly. Message gateway 241 saves the registration information registration request 205 in its database and returns success message 206 to workstation 233.

Subsequently, the printer 236 (e.g., a UPnP printer) is powered on and sends announcement 207. Server 234 detects announcement 207 and routes registration request 208 to message broker 237. Message broker 237 forwards registration request 208 to message gateway 241. Message gateway 241 saves the registration information registration request 208 in its database and returns success message 210 to server 234.

Subsequently, personal computer 242 issues lookup request 211 to discover all devices. Since personal computer 242 doesn't know where to forward lookup request 211, it routes lookup request 211 through workstation 243. As registration and lookup requests are routed to the same destination, the routing protocol essentially guarantees rendezvous between the two requests resulting in workstation 243 forwards find request 211 to message gateway 241. Message gateway 241 looks up the registration information maintained by it and forwards find request 211 to both the workstation 233 and server 234. Workstation 233 and server 234 send response messages 214 and 216 respectively to personal computer 242.

This fourth mechanism works by routing (instead of flooding) a request to the node (message gateway 241) that has global knowledge of the registrations specified in a request. This fourth mechanism, as will be described in further detail below, essentially guarantees that routing can be accomplished in O(log N) hops, where N is the number of nodes participating in the federation infrastructure. Since this fourth mechanism efficiently partitions both node partnership and registration information, it scales to very large networks, even the Internet.

Although a number of federating mechanisms have been described, it would be apparent to one skilled in the art, after having reviewed this description, that other federation mechanisms are possible.

Relationship Between Nodes in a Federation

Accordingly, a federation consists of a set of nodes that cooperate among themselves to form a dynamic and scalable network in which information can be systematically and efficiently disseminated and located. Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked listed. In addition, a 1:1 mapping function from the value domain of the node identities to the nodes themselves is defined.

FIG. 3 depicts an example linked list 304 and corresponding ring 306. Given such a ring, the following functions can be defined:

RouteNumerically(V, Msg): Given a value V from the value domain of node identities and a message "Msg," deliver the message to node X whose identity can be mapped to V using the mapping function.

Neighborhood(X, S): Neighborhood is the set of nodes on the either side of node X with cardinality equal to S.

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:

An ID which is a numerical value uniformly distributed in the range of 0 to $b^n-1$; and A routing table consisting of (all arithmetic is done modulo $b^n$):

Successor node (s);

Predecessor node (p);

Neighborhood nodes $(p_k, \ldots, p_1, p, s, s_1, \ldots, s_j)$ such that $s_j.s.id>(id+u/2)$, $j \geq v/2-1$, and $p_k.p.id<(id-u/2)$, and $k \geq v/2-1$; and Routing nodes $(r_{-(n-1)}, \ldots, r_{-1}, r_1, \ldots, r_{n-1})$ such that $r_{\pm i}$=RouteNumerically($id \pm b^i$, Msg).

where b is the number base, n is the field size in number of digits, u is the neighborhood range, v is the neighborhood size, and the arithmetic is performed modulo $b^n$. For good routing efficiency and fault tolerance, values for u and v can be u=b and $v \geq \max(\log_2(N), 4)$, where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of $id \pm b^i$ where $i=(1, 2, \ldots (n-1))$. However, it may be that there are not existing nodes at each number in the set. IN those cases, a node closest to $id \pm b^i$ can be selected as a routing node. The resulting logarithmic index is not precise and may even lack unique routing nodes for some numbers in the set.

Referring again to FIG. 3, FIG. 3 illustrates an example of a binary relation between nodes in a federation infrastructure in the form of sorted list 304 and corresponding ring 306. The ID space of sorted list 304 is in the range 0 to $2^8-1$ (or 255). That is, b=2 and n=8. Thus, nodes depicted in FIG. 3 are assigned IDs in a range from 0 to 255. Sorted list 304 utilizes a binary relation that is reflexive, anti-symmetric, transitive, total, and defined over the domain of node identities. Both ends of sorted list 304 are joined, thereby forming ring 306. This makes it possible for each node in FIG. 3 to view itself as being at the middle of sorted list 304. The sorted list 304 is doubly linked so that any node can traverse the sorted list 304 in either direction. Arithmetic for traversing sorted list 304 (or ring 306) is performed modulo $2^8$. Thus, 255 (or the end of sorted list 304)+1=0 (or the beginning of sorted list 304).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of id±$2^i$ where i=(1, 2, 3, 4, 5, 6, 7). That is, b=2 and n=8. For example, the node having ID 76 can be identified from calculating the closest node to 64+$2^3$, or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to 243). The node having ID 2 can in turn implement RouteNumerically(243, Msg) to cause the message to be routed (directly or through further intermediary nodes) to the node having ID 250. Thus, it may be that a RouteNumerically function is recursively invoked with each invocation routing a message closer to the destination.

Advantageously, other embodiments of the present invention facilitate partitioning a ring into a ring of rings or tree of rings based on a plurality of proximity criteria of one or more proximity categories (e.g., geographical boundaries, routing characteristics (e.g., IP routing hops), administrative domains, organizational boundaries, etc.). It should be understood a ring can be partitioned more than once using the same type of proximity criteria. For example, a ring can be partition based on a continent proximity criteria and a country proximity criteria (both of a geographical boundaries proximity category).

Since IDs can be uniformly distributed across an ID space (a result of random number generation) there is a high probability that any given segment of a circular ID space contains nodes that belong to different proximity classes provided those classes have approximately the same cardinality. The probability increases further when there are a sufficient number of nodes to obtain meaningful statistical behavior.

Thus, neighborhood nodes of any given node are typically well dispersed from the proximality point of view. Since published application state can be replicated among neighborhood nodes, the published information can be well dispersed as well from the proximality point of view.

Figure 4:
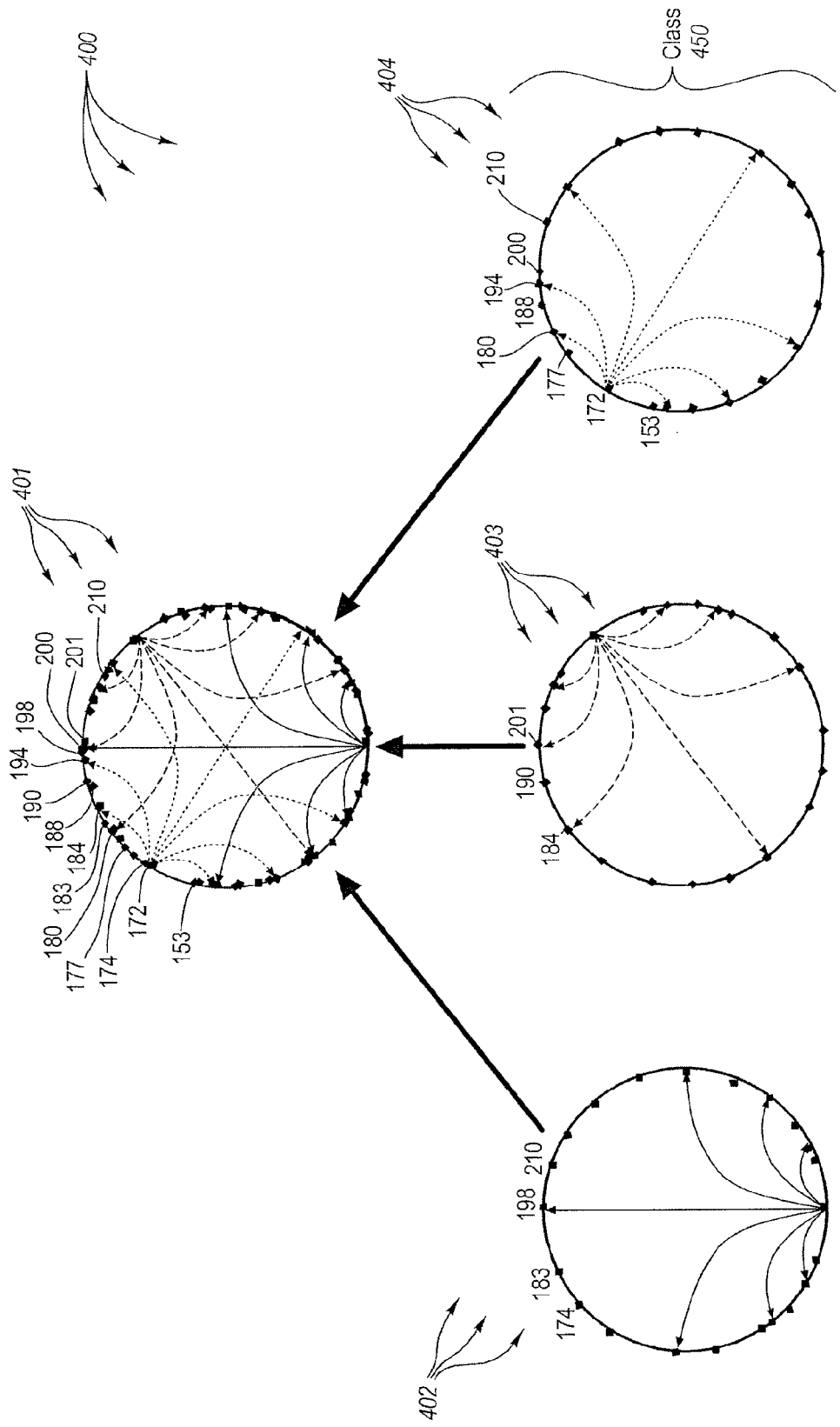
FIG. 4 illustrates an example ring of rings that facilitates proximal routing.

FIG. 4 illustrates a ring of rings 400 that facilitates proximal routing. Ring 401 can be viewed as a master or root ring, and contains all the nodes in each of the rings 402, 403, and 404. Each of the rings 402, 403, and 404 contain a subset of nodes from ring 401 that are partitioned based on a specified proximity criterion. For example, ring 401 may be partitioned based on geographic location, where ring 402 contains nodes in North America, ring 403 contains nodes in Europe, and ring 404 contains nodes in Asia.

In a numerical space containing 65,536 ($2^{16}$) IDs, routing a message from a North American node having an ID 5,345 to an Asian node having an ID 23,345 can include routing the message within ring 402 until a neighbor node of the Asian node is identified. The neighbor node can then route the message to the Asian node. Thus, a single hop (as opposed to multiple hops) is made between a North American node and an Asian node. Accordingly, routing is performed in a resource efficient manner.

Figure 5:
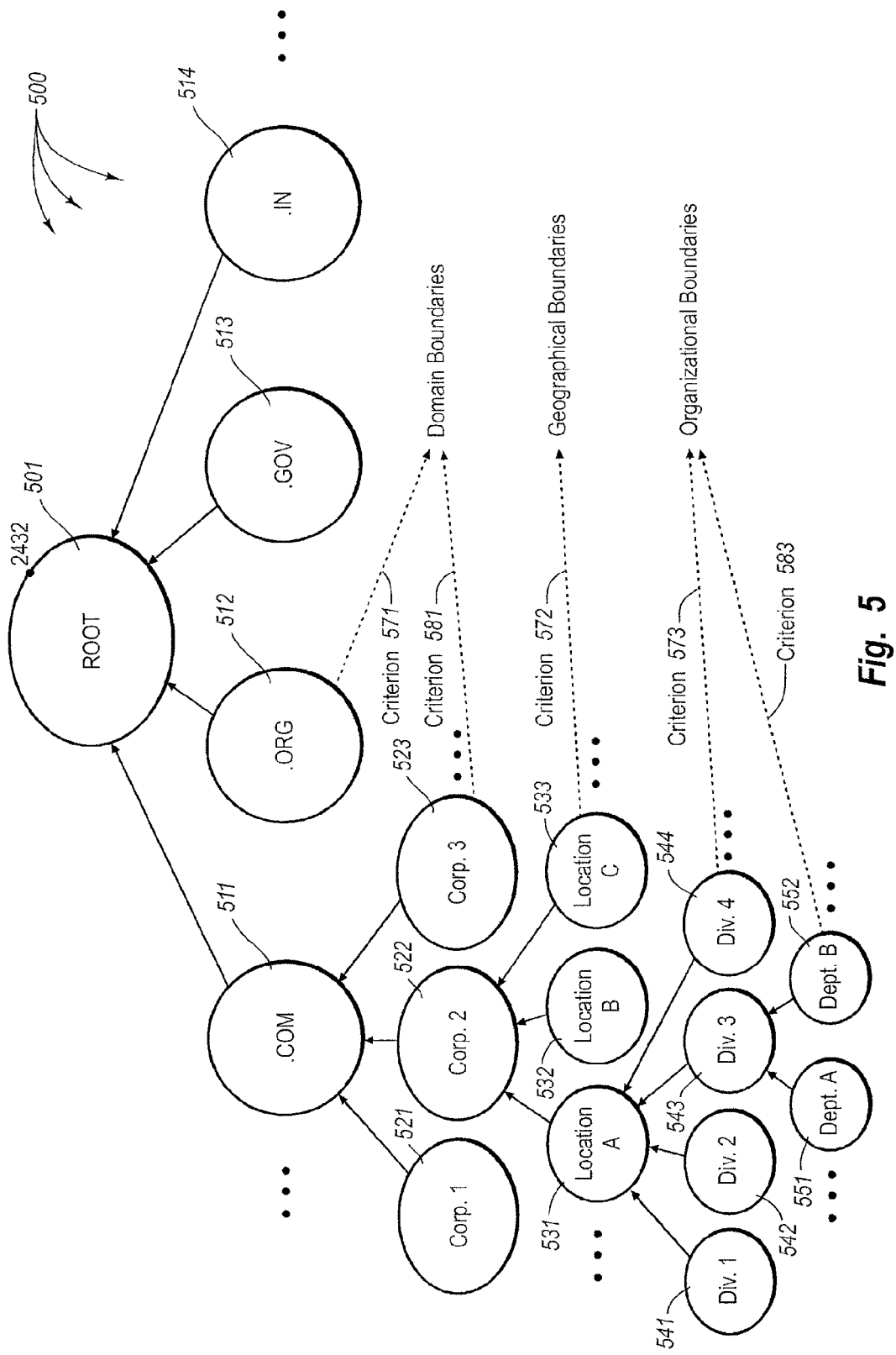
FIG. 5 illustrates an example proximity induced partition tree of rings that facilitates proximal routing.

FIG. 5 illustrates an example proximity induced partition tree of rings 500 that facilitates proximal routing. As depicted, partition tree of rings 500 includes a number of rings. Each of the rings represents a partition of a sorted linked list. Each ring including a plurality a nodes having IDs in the sorted linked list. However for clarity due to the number of potential nodes, the nodes are not expressly depicted on the rings (e.g., the ID space of partition tree 500 may be b=16 and n=40).

Within partition tree 500, root ring 501 is partitioned into a plurality of sub-rings, including sub-rings 511, 512, 513, and 514, based on criterion 571 (a first administrative domain boundary criterion). For example, each component of a DNS name can be considered a proximity criterion with the partial order among them induced per their order of appearance in the DNS name read right to left. Accordingly, sub-ring 511 can be further partitioned into a plurality of sub-rings, including sub-rings 521, 522, and 523, based on criterion 581 (a second administrative domain boundary criterion).

Sub-ring 522 can be further partitioned into a plurality of sub-rings, including sub-rings 531, 532, and 533, based on criterion 572 (a geographic boundary criterion). Location based proximity criterion can be partially ordered along the lines of continents, countries, postal zip codes, and so on. Postal zip codes are themselves hierarchically organized meaning that they can be seen as further inducing a partially ordered sub-list of proximity criteria.

Sub-ring 531 can be further partitioned into a plurality of sub-rings, including sub-rings 541, 542, 543, and 544, based on criterion 573 (a first organizational boundary criterion). A partially ordered list of proximity criterion can be induced along the lines of how a given company is organizationally structured such as divisions, departments, and product groups. Accordingly, sub-ring 543 can be further partitioned into a plurality of sub-rings, including sub-rings 551 and 552, based on criterion 583 (a second organizational boundary criterion).

Within partition tree 500, each node has a single ID and participates in rings along a corresponding partition path starting from the root to a leaf. For example, each node participating in sub-ring 552 would also participate in sub-rings 543, 531, 522, 511 and in root 501. Routing to a destination node (ID) can be accomplished by implementing a RouteProximally function, as follows:

RouteProximally(V, Msg, P): Given a value V from the domain of node identities and a message "Msg," deliver the message to the node Y whose identity can be mapped to V among the nodes considered equivalent by the proximity criteria P.

Thus, routing can be accomplished by progressively moving closer to the destination node within a given ring until no further progress can be made by routing within that ring as determined from the condition that the destination node lies between the current node and its successor or predecessor node. At this point, the current node starts routing via its partner nodes in the next larger ring in which it participates. This process of progressively moving towards the destination node by climbing along the partitioning path towards the root ring terminates when the closest node to the destination node is reached within the requested proximal context, as originally specified in the RouteProximally invocation.

Routing hops can remain in the proximal neighborhood of the node that originated the request until no further progress can be made within that neighborhood because the destination node exists outside it. At this point, the proximity criterion is relaxed to increase the size of the proximal neighborhood to make further progress. This process is repeated until the proximal neighborhood is sufficiently expanded to include the destination node (ID). The routing hop made after each successive relaxation of proximal neighborhood criterion can be a potentially larger jump in proximal space while making a correspondingly smaller jump in the numerical space compared to the previous hop. Thus, only the absolutely required number of such (inter-ring) hops is made before the destination is reached.

It may be the case that some hops are avoided for lookup messages since published application data gets replicated down the partition tree when it is replicated among the neighborhood nodes of the destination node.

To accomplish proximal routing, each federation node maintains references to its successor and predecessor nodes in all the rings it participates as a member (similar to successor and predecessor for a single ring)—the proximal predecessor, proximal successor, and proximal neighborhood. In order to make the routing efficient, the nodes can also maintain reference to other nodes closest to an exponentially increasing distance on its either half of the ring as routing partners (similar to routing nodes for a single ring). In some embodiments, routing partner nodes that lie between a pair of consecutive successor or predecessor nodes participate in the same lowest ring shared by the current node and the node numerically closest to it among the successor or predecessor node pairs respectively. Thus, routing hops towards a destination node transition into using a relaxed proximity criterion (i.e., transitioning to a higher ring) only when absolutely needed to make further progress. Accordingly, messages can be efficiently rendezvoused with a corresponding federation node.

In some embodiments, nodes implement a proximal routing function to route messages based on equivalence criteria relations. Thus, given a number V and a message "Msg", a node can implement RouteProximally(V, Msg, P) to deliver the message to the node Y whose identify can be mapped to V among the nodes considered equivalent by proximity criterion P. The proximity criterion P identifies the lowest ring in the partition tree that is the common ancestor to all the nodes considered proximally equivalent by it. It can be represented as a string obtained by concatenating the proximity criterion found along the path from the root ring to the ring identified by it separated by the path separator character '/'. For example, the proximity criterion identifying sub-ring 542 can be represented as "Proximity:/.COM/Corp2/LocationA/Div2". Each ring in the partition tree 500 can be assigned a unique number, for example, by hashing its representational string with a SHA based algorithm. If the number 0 is reserved for the root ring, it can be inferred that RouteNumerically(V, Msg)≡RouteProximally(V, Msg, 0).

For example, a node in sub-ring 544 can implement RouteProximally to identify a closer node in sub-ring 531 (e.g., to a node in sub-ring 513). In turn, sub-ring 531 can implement RouteProximally to identify a closer node in sub-ring 522. Likewise, sub-ring 522 can implement RouteProximally to identify a closer node in sub-ring 511. Similarly, sub-ring 511 can implement RouteProximally to identify a closer node in ring 501. Thus, it may be that a RouteProximally function is recursively invoked with each invocation routing a message closer to the destination.

Thus, when proximity criterion is taken into account, routing hops on a path to a final destination can remain within the proximity of a node that originates a request, while making significant progress between the originating node and the destination node in a numerical space, until either the destination node is reached or no further progress can be made under the chosen proximity criterion at which point it is relaxed just enough to make further progress towards the destination. For example, proximity criterion can be relaxed enough for a message to be routed from ring 531 up to ring 522, etc.

Utilizing the above approach to proximity, it is possible to confine published information to a given ring. For example, organizations may like to ensure that organization specific information is not available to entities outside of their trust domains either (1) implicitly in the form of neighborhood replication to nodes outside of their domains or (2) explicitly in the form of servicing lookup requests for such information. The first aspect is satisfied by replicating published information only among the nodes neighboring the target ID within the specified ring. Because all messages originated by a node are routed by successively climbing the rings to which it belongs towards the root ring, there is a high likelihood that all lookup requests originated within an organization will be able to locate the published information confined to it thereby implicitly satisfying the second aspect.

Also, organizations dislike nodes automatically federating with nodes outside of their trust domain. This can happen, for example, when a visiting sales person connects his/her laptop computer to the network in the customer premises. Ideally, the laptop computer belonging to the sales person wishes to locate information published in its home domain and/or federate with the nodes in its home domain starting at its lowest preferred proximity ring. It will typically not be permitted to federate with the nodes in the customer's domain. Supporting this scenario requires ability to locate seed nodes in the home domain. Such seed nodes can be used for locating information published in the home domain, to join the home federation, and selectively import and export published information across domains. Seed nodes are also sometimes referred as message gateways.

In other embodiments, an entity publishes references to seed nodes in the root ring. Seed nodes can be published at the unique number (such as the one obtained by hashing its representational string) associated with the ring (as a target ID). Seed node information can further be on-demand cached by the nodes in various rings that are on the path to the corresponding target IDs in the root ring. Such on-demand caching provides for improved performance and reduction in hotspots that might occur when semi-static information is looked up quite frequently. Seed node information can also be obtained via other means such as DNS To provide fault tolerance for confined published information, each node can maintain a set of neighborhood nodes in all of the rings it participates in. Given the above, the state maintained by a node can be summarized as follows:

An ID which is a numerical value uniformly distributed in the range of 0 to $b^n-1$.

A routing table consisting of (all arithmetic is done modulo $b^n$):

For each ring, say ring d, in which the node participates
        Successor node ($s_d$)
        Predecessor node ($p_d$)
        Neighborhood nodes ($p_{kd}, \ldots, p_{1d}, p_d, s_d, s_{1d}, \ldots, s_{jd}$) such that $s_{jd}.s_d.\text{id} > (\text{id}+u/2)$, $j \geq v/2-1$, $p_{kd}.p_d.\text{id} < (\text{id}-u/2)$, and $k \geq v/2-1$.
        Routing nodes ($r_{-(n-1)}, \ldots, r_{-1}, r_1, \ldots, r_{n-1}$) such that $r_{\pm i} = \text{RouteProximally}(\text{id} \pm b^i, \text{updateMsg}, d)$ such that $s_d \leq \text{id}+b^i \leq s_{d+1}$ or $p_{d+1} \leq \text{id}-b^i < p_d$ as appropriate.

where b is the number base, n is the field size in number of digits, u is the neighborhood range, and v is the neighborhood size.

Note that a subset of the neighborhood nodes maintained by a given node in ring "d" can appear again as neighborhood nodes in the child ring "d+1" in which the given node participates as well. As such one can derive the upper bound on the total number of neighborhood nodes maintained by a given node across all the D rings it participates as D*max(u,v)/2. This considers that only one reference to a given node is kept and the worst case upper bound is for a balanced tree.

It should be noted that when a ring is partitioned into a plurality of corresponding sibling sub-rings, it is permitted for a specified node to simultaneously participate in more than one of the plurality of corresponding sibling sub-rings, for example, through aliasing. Aliasing can be implemented to associate different state, for example, from different sub-rings, with the specified node. Thus, although aliases for a given node have the same ID, each alias can have distinct state associated with them. Aliasing allows the specified node to participate in multiple rings having distinct proximity criteria that are not necessarily common ancestors of more specific proximity criteria. That is, the specified node can participate in multiple branches of the proximity tree.

For example, a dual NIC (wired and wireless) laptop can be considered to be proximally equivalent to both other wireless and wired nodes sharing the same LAN segments as the laptop. But, these two distinct proximity criteria can be modeled as sub-criteria that are applicable only after application of a different higher priority proximity criterion, such as, for example, one based on organizational membership. As the laptop belongs to the same organization, the aliased nodes in the two sub-rings representing 1) membership in the wired and 2) membership in the wireless LAN segments merge into a single node in the ring representing the organization to which the laptop belongs. It should be understand that the RouteProximally works as expected without any modifications in the presence of aliasing.

Each proximal ring can be configured in accordance with (potentially different) ring parameters. Ring parameters can be used to define a neighborhood (e.g., ring parameters can represent a neighborhood range, a neighborhood size, ping message and depart message timing and distribution patterns for ping and depart messages), indicate a particular federating mechanisms (e.g., from among the above-described first through fourth federating mechanisms previously described or from among other federating mechanisms), or define communication specifics between routing partners in the same proximal ring. Some ring parameters may be more general, applying to a plurality of different federating mechanisms, while other ring parameters are more specific and apply to specific type of federating mechanism.

Ring parameters used to configure a higher level proximal ring can be inherited in some embodiments by lower level proximal rings. For example, it may be that ring 543 inherits some of the ring parameters of ring 531 (which in turn inherited from ring 522, etc.). Thus, a neighborhood size and neighborhood range associated with ring 531 is also associated with ring 541.

However, inherited ring parameters can be altered and/or proximal rings can be individually configured in accordance with different ring parameters. For example, it may be that ring 511 is for an administrative domain that contains a large number of nodes and thus the above-described fourth federating mechanism is more appropriate for ring 511. On the other hand, it may be that ring 521 is for a small business with a relatively smaller number of nodes and thus the above-described second federating mechanism is more appropriate for ring 521. Thus, the ring parameters associated with ring 521 can be set to (or inherited parameters changed to) different values than the ring parameters associated with ring 511. For example, a ring parameter indicating a particular type of federating mechanisms can be different between rings 511 and 521. Similarly parameters defining a neighborhood can be different between rings 511 and 521. Further, ring 521 can be configured in accordance with specific parameters that are specific to the above-described second federating mechanism, while ring 511 is configured in accordance additional with specific parameters that are specific to the above-described fourth federating mechanism.

Accordingly, proximal rings can be flexibly configured based on the characteristics (e.g., number, included resources, etc.) of nodes in the proximal rings. For example, an administrator can select ring parameters for proximal rings using a configuration procedure (e.g., through a user-interface). A configuration procedure can facilitate the configuration of inheritance relationships between proximal rings as well as the configuration of individual proximal rings, such as, for example, to override otherwise inherited ring parameters.

Figure 8:
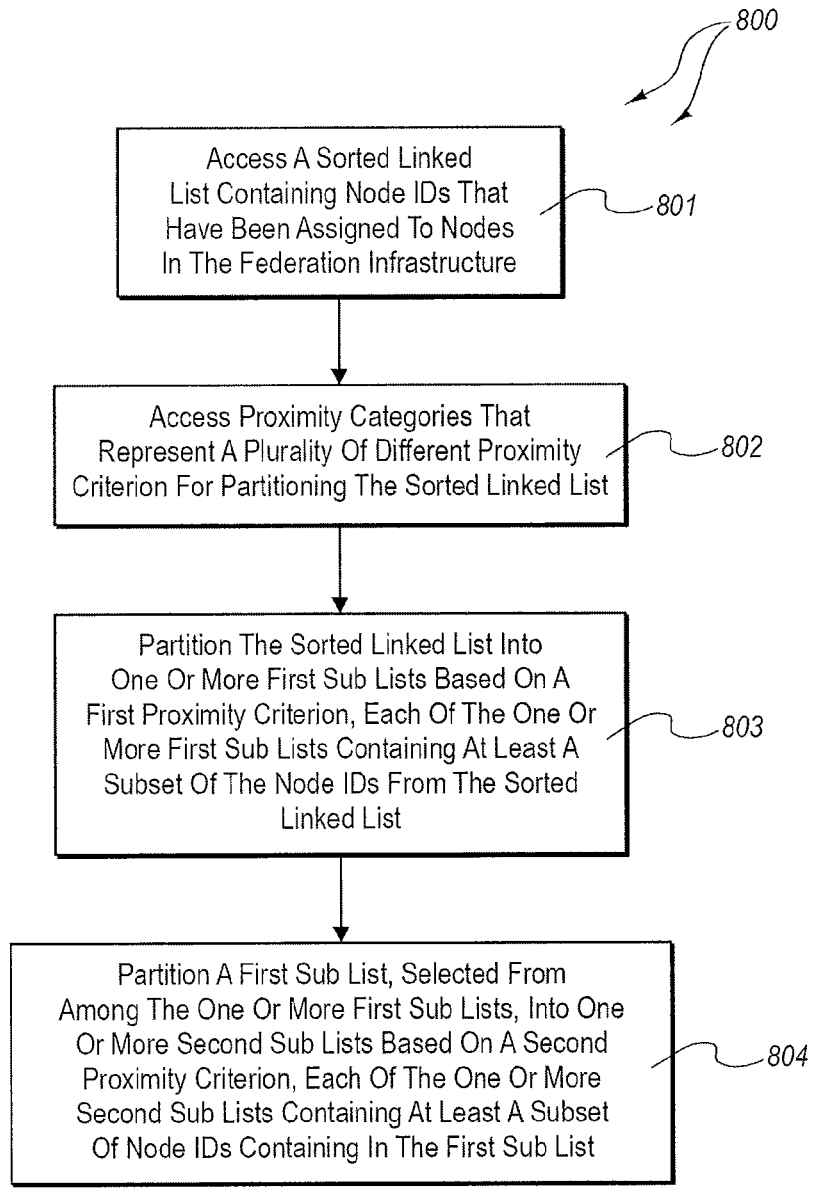
FIG. 8 illustrates an example flow chart of a method for partitioning the nodes of a federation infrastructure.

FIG. 8 illustrates an example flow chart of a method 800 for partitioning the nodes of a federation infrastructure. The method 800 will be described with respect to the rings of partition a tree 500 in FIG. 5. Method 800 includes an act of accessing a sorted linked list containing node IDs that have been assigned to nodes in a federation infrastructure (act 801). For example, the sorted linked list represented by ring 501 can be accessed. The node IDs of the sorted linked list (the nodes depicted on ring 501) can represent nodes in a federation infrastructure (e.g., federation infrastructure 100).

Method 800 includes an act of accessing proximity categories that represent a plurality of different proximity criteria for partitioning the sorted linked list (act 802). For example, proximity criterion representing domain boundaries 561, geographical boundaries 562, and organizational boundaries 563 can be accessed. However, other proximity criteria, such as, trust domain boundaries, can also be represented in accessed proximity criterion. Proximity categories can include previously created partially ordered lists of proximity criteria. A ring can be partitioned based on partially ordered lists of proximity criteria.

Method 800 includes an act of partitioning the sorted link list into one or more first sub lists based on a first proximity criterion, each of the one or more first sub lists containing at least a subset of the node IDs from the sorted linked list (act 803). For example, ring 501 can be partitioned into sub-rings 511, 512, 513, and 514 based on criterion 571. Each of sub-rings 511, 512, 513, and 514 can contain a different sub-set of node IDs from ring 501.

Method 800 includes an act of partitioning a first sub list, selected from among the one or more first sub lists, into one or more second sub lists based on a second proximity criterion, each of the one or more second sub lists containing at least a subset of node IDs contained in the first sub list (act 804). For example, sub-ring 511 can be partitioned into sub-rings 521, 522, and 523 based on criterion 581. Each of the sub-rings 521, 522, and 523 can contain a different sub-set of node IDs from sub-ring 511.

Figure 9:
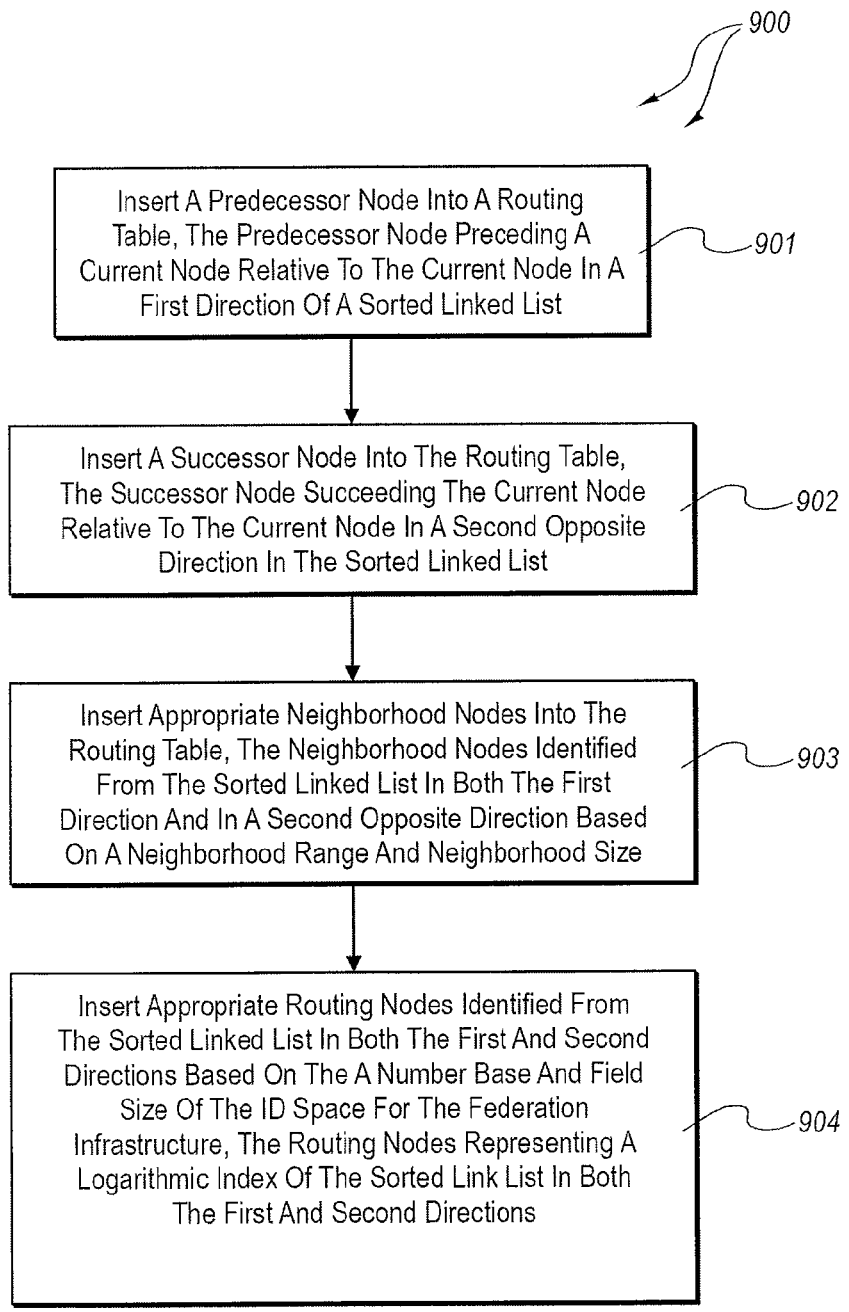
FIG. 9 illustrates an example flow chart of a method for populating a node routing table.

FIG. 9 illustrates an example flow chart of a method 900 for populating a node's routing table. The method 900 will be described with respect to the sorted linked list 304 and ring 306 in FIG. 3. Method 900 includes an act of inserting a predecessor node into a routing table, the predecessor node preceding a current node relative to the current node in a first direction of a sorted linked list (act 901). For example, the node having ID 50 can be inserted into the routing table as a predecessor for the node having ID 64 (the current node). Moving in a clockwise direction 321 (from end A of sorted linked list 304 towards end B of sorted linked list 304), the node having ID 50 precedes the node having ID 64. Inserting a predecessor node can establish a symmetric partnership between the current node and the predecessor node such that current node is a partner of predecessor node and the predecessor node is a partner of the current node Method 900 includes an act of inserting a successor node into the routing table, the successor node succeeding the current node relative to the current node in the first direction in the sorted linked list (act 902). For example, the node having ID 76 can be inserted into the routing table as a successor for the node having ID 64 (the current node). Moving in a counter-clockwise direction 322, the node having ID 76 succeeds the node having ID 64. Inserting a successor node can establish a symmetric partnership between the current node and the successor node such that current node is a partner of the successor node and the successor node is a partner of the current node.

Method 900 includes an act of inserting appropriate neighborhood nodes into the routing table, the neighborhood nodes identified from the sorted linked list in both the first direction and in a second opposite direction based on a neighborhood range and neighborhood size (act 903). For example, the nodes having IDs 83, 76, 50, and 46 can be inserted into the routing table as neighborhood nodes for the node having ID 64 (the current node). Based on a neighborhood range of 20 and a neighborhood size 4, the nodes having IDs 83 and 76 can be identified in clockwise direction 321 and the nodes having IDs 50 and 46 can be identified in counter-clockwise direction 322 (moving from end B of sorted linked list 304 towards end A of sorted linked list 304). It may be that in some environments no appropriate neighborhood nodes are identified. Inserting a neighborhood node can establish a symmetric partnership between the current node and the neighborhood node such that current node is a partner of the neighborhood node and the neighborhood node is a partner of the current node.

Method 900 includes an act of inserting appropriate routing nodes into the routing table, the routing nodes identified from the sorted linked list in both the first and second directions based on the a number base and field size of the ID space for the federation infrastructure, the routing nodes representing a logarithmic index of the sorted link list in both the first and second directions (act 904). For example, the nodes having IDs 200, 2, 30, 46, 50, 64, 64, 64, 64, 64, 76, 83, 98, 135 and 200 can be inserted into the routing table as routing nodes for the node having ID 64. Based on the number base 2 and field size of 8 the nodes having IDs 64, 64, 76, 83, 98, 135 and 200 can be identified in direction 321 and the nodes having IDs 64, 64, 50, 46, 30, 2, and 200 can be identified in direction 322. As depicted inside ring 306, the routing nodes represent a logarithmic index of the sorted link list 304 in both clockwise direction 321 and counter-clockwise direction 322. Inserting a routing node can establish a symmetric partnership between the current node and the routing node such that current node is a partner of the routing node and the routing node is a partner of the current node.

Figure 7:
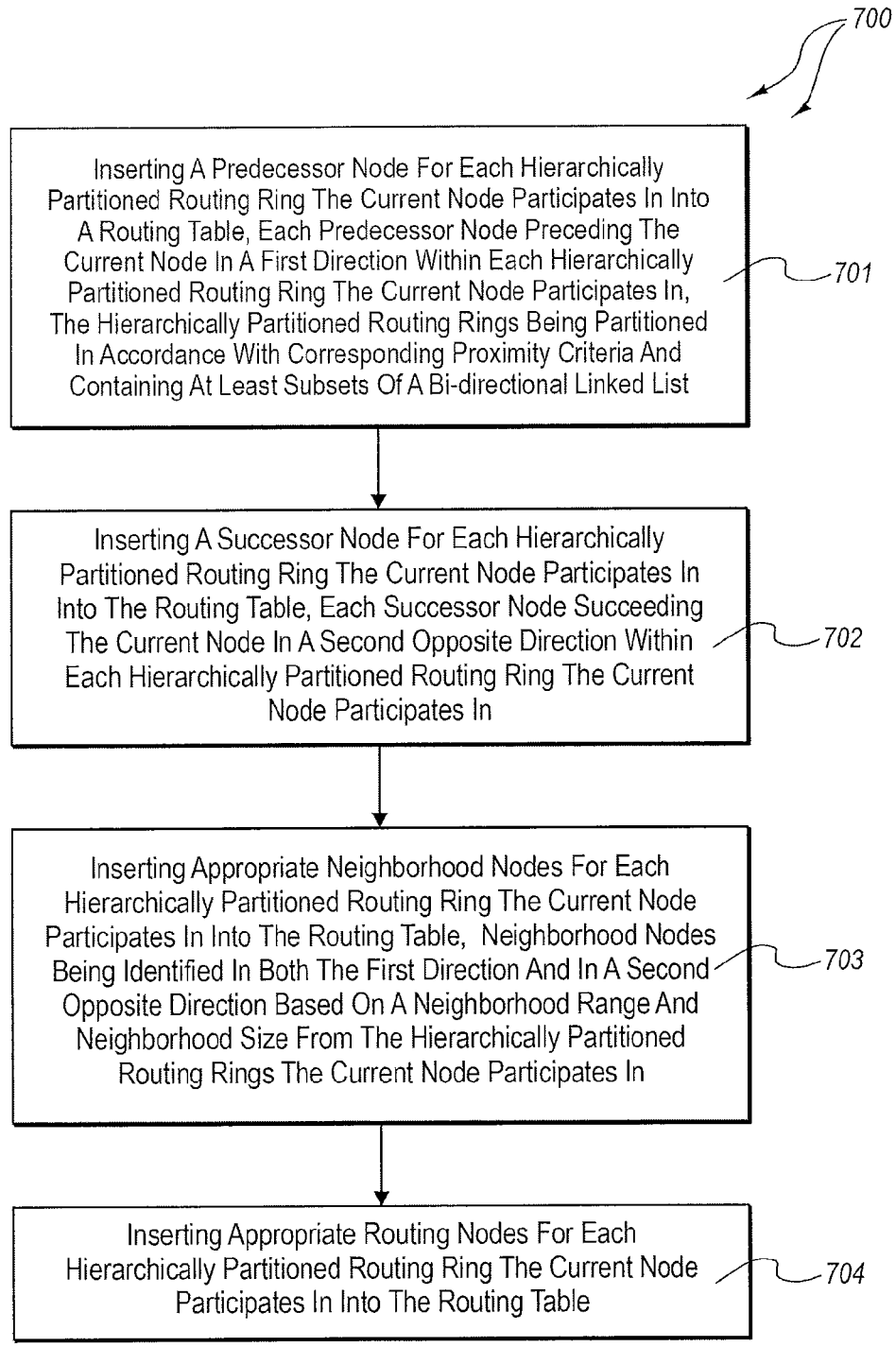
FIG. 7 illustrates an example flow chart of a method for populating a node routing table that takes proximity criteria into account

FIG. 7 illustrates an example flow chart of a method 700 for populating a node routing table that takes proximity criteria into account. The method 700 will be described with respect to the rings in FIG. 5. Method 700 includes an act of inserting a predecessor node for each hierarchically partitioned routing ring the current node participates in into a routing table (act 701). Each predecessor node precedes the current node in a first direction (e.g., clockwise) within each hierarchically partitioned routing ring the current node participates in. The hierarchically partitioned routing rings are partitioned in accordance with corresponding proximity criteria and contain at least subsets of a bi-directionally linked list (and possibly the whole bi-directionally linked list). For example, it may be that a specified node participates in root ring 501 and sub-rings 511, 522, 523, 531, and 542. Thus, a predecessor node is selected for the specified node from within each of the rings 501 and sub-rings 511, 522, 523, 531, and 542.

Method 700 includes an act of inserting a successor node for each hierarchically partitioned routing ring the current node participates in into the routing table (act 702). Each successor node succeeding the current node in the first direction within each hierarchically partitioned routing ring the current node participates in. For example, a successor node is selected for the specified node from within each of the rings 501 and sub-rings 511, 522, 523, 531, and 542.

Method 700 includes an act of inserting appropriate neighborhood nodes for each hierarchically partitioned routing ring the current node participates in into the routing table (act 703). The neighborhood nodes can be identified in both the first direction (e.g., clockwise) and in a second opposite direction (e.g., counter clockwise) based on a neighborhood range and neighborhood size from the hierarchically partitioned routing rings the current node participates in. For example, neighborhood nodes can be identified for the specified node from within each of the rings 501 and sub-rings 511, 522, 523, 531, and 542.

Method 700 includes an act of inserting appropriate routing nodes for each hierarchically partitioned routing ring the current node participates in into the routing table (act 704). For example, routing nodes can be identified for the specified node from within each of the rings 501 and sub-rings 511, 522, 523, 531, and 542.

In some embodiments, appropriate routing nodes are inserted for each proximity ring d except the leaf ring (or leaf rings in embodiments that utilize aliasing), in which the node Y participates. Appropriate routing nodes can be inserted based on the following expression(s):

if $Y.s_d.id < Y.id + b^{i < Y.s}{}_{d+1}.id$ is true, then use ring d; or if $Y.p_d.id < Y.id - b^i < Y.p_{d+1}.id$ is true, then use ring d.

If a ring has not been identified in the previous step, use the lead (e.g., ring 501) ring as ring d. Now, ring d is the proximity ring in which node Y should look for the routing partner closest to z.

Figure 10:
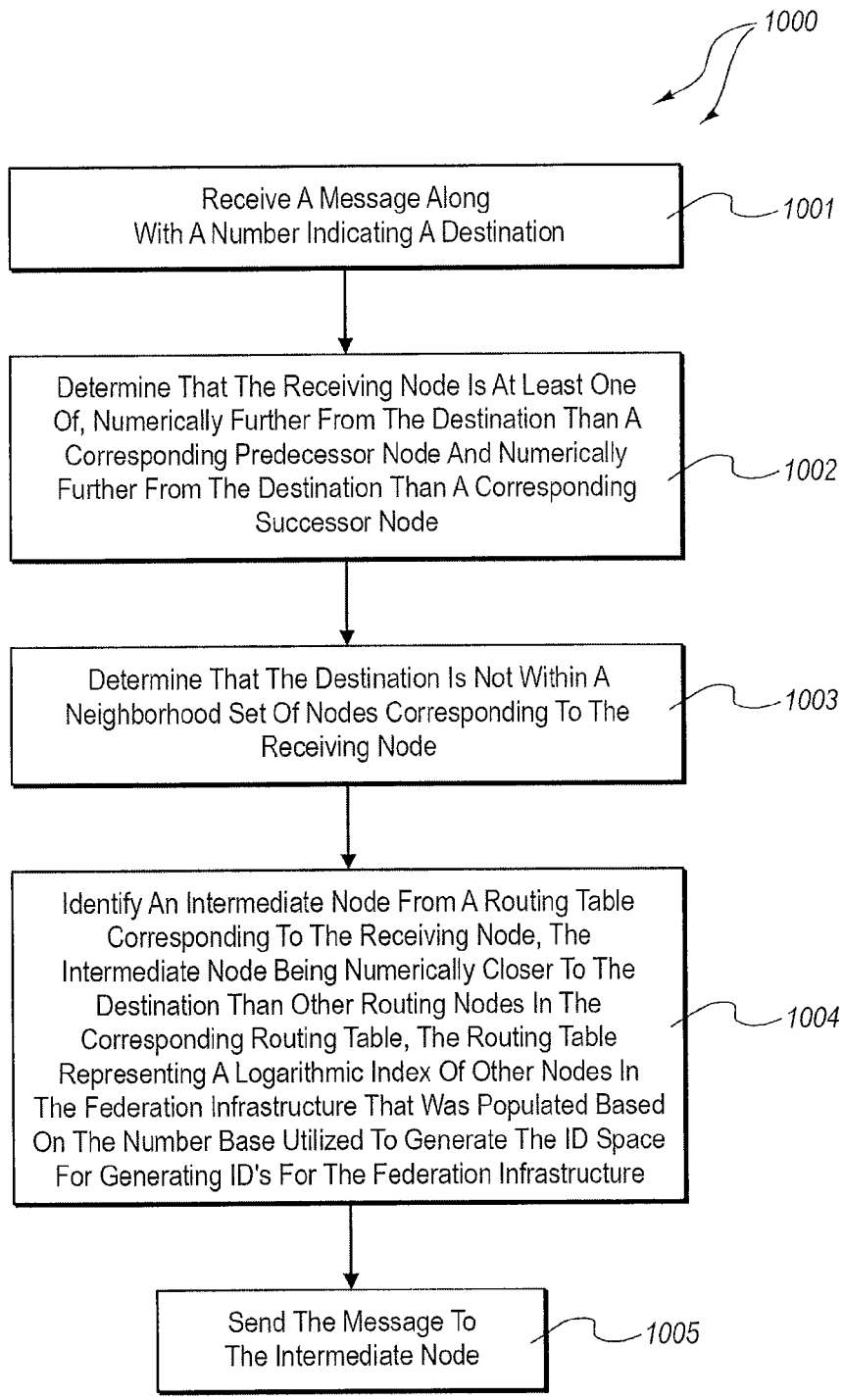
FIG. 10 illustrates an example flow chart of a method for numerically routing a message towards a destination node.

FIG. 10 illustrates an example flow chart of a 1000 method for routing a message towards a destination node. The method 1000 will be described with respect to the sorted linked list 304 and ring 306 in FIG. 3. Method 1000 includes an act of a receiving node receiving a message along with a number indicating a destination (act 1001). For example, the node having ID 64 can receive a message indicating a destination of 212.

Method 1000 includes an act of determining that the receiving node is at least one of numerically further from the destination than a corresponding predecessor node and numerically further from the destination than a corresponding successor node (act 1002). For example, in direction 322, ID 64 is further from destination 212 than ID 50 and, in direction 321, ID 64 is further from destination 212 than ID 76. Method 1000 includes an act of determining that the destination is not within a neighborhood set of nodes corresponding to the receiving node (act 1003). For example, the node with ID 64 can determine that destination 212 is not within the neighborhood set of 83, 76, 50, and 46.

The method 1000 includes an act of identifying an intermediate node from a routing table corresponding to the receiving node, the intermediate node being numerically closer to the destination than other routing nodes in the corresponding routing table (act 1004). For example, the node having ID 64 can identify the routing node having ID 200 as being numerically closer to destination 212 that other routing nodes. The method 1000 includes an act of sending the message to the intermediate node (act 1005). For example, the node having ID 64 can send the message to the node having ID 200.

Figure 11:
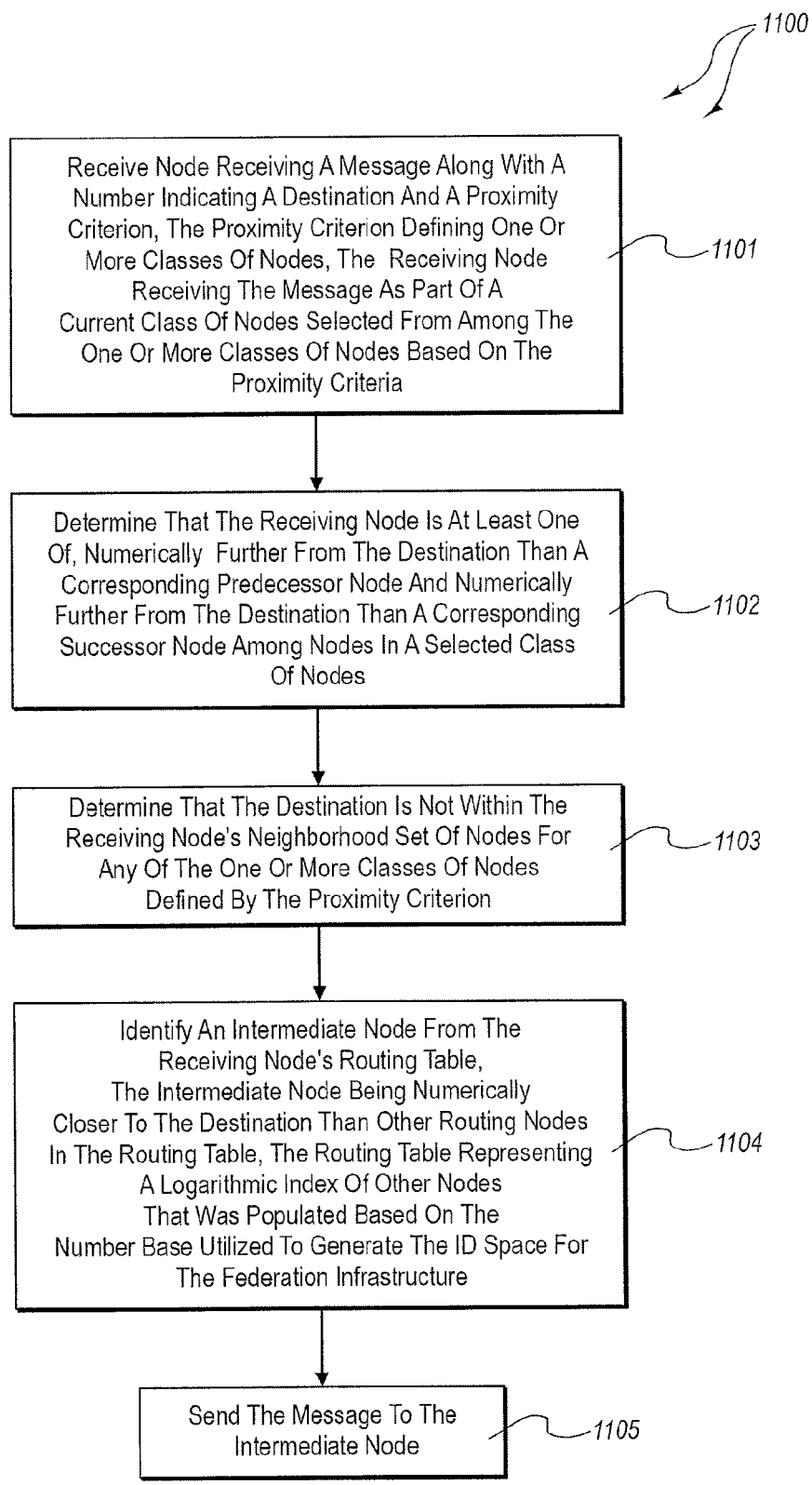
FIG. 11 illustrates an example flow chart of a method for proximally routing a message towards a destination node.

FIG. 11 illustrates an example flow chart of a method 1100 for routing a message towards a destination node based on proximity criteria. The method 1100 will be described with respect to the rings in FIG. 4 and FIG. 5. Method 1100 includes an act of a receiving node receiving a message along with a number indicating a destination and a proximity criterion (act 1101). The proximity criterion defines one or more classes of nodes. The receiving node receives the message as part of a current class of nodes selected form among the one or more classes of nodes based on the proximity criterion. For example, the node having ID 172 can receive a message indicating a destination of 201 and proximity criterion indicating that the destination node be part of classes represented by ring 401. The node having ID 172 can receive the message as part of ring 404.

Method 1100 includes an act of determining that the receiving node is at least one of, numerically further from the destination than a corresponding predecessor node and numerically further from the destination than a corresponding successor node, among nodes in a selected class of nodes (act 1102). For example, within ring 404, the node with ID 172 is further from destination 201 than the node having ID 174 in the clockwise direction and is further from destination 201 than the node having ID 153 in the counterclockwise direction.

Method 1100 includes an act of determining that the destination is not within the receiving node's neighborhood set of nodes for any of the one or more classes of nodes defined by the proximity criterion (act 1103). For example, the node having ID 172 can determine that destination 201 is not in a corresponding neighborhood set in ring 404 or in ring 401.

Method 1100 includes an act of identifying an intermediate node from the receiving node's routing table, the intermediate node being numerically closer to the destination than other routing nodes in the routing table (act 1104). For example, the node having ID 172 can identify the node having ID 194 as being numerically closer to destination 201 than other routing nodes in ring 404. The method 1100 includes an act of sending the message to the intermediate node (act 1105). For example, the node having ID 172 can send the received message to the node having ID 194. The node having ID 172 can send the received message to the node having ID 194 to honor a previously defined partially ordered list of proximity criterion Node 194 may be as close to destination 201 as is possible within ring 404. Thus, proximity can be relaxed just enough to enable further routing towards the destination to be made in ring 401 in the next leg. That is, routing is transitioned from ring 404 to ring 401 since no further progress towards the destination can be made on ring 404. Alternately, it may be that the node having ID 201 is within the neighborhood of the node having ID 194 in ring 401 resulting in no further routing. Thus, in some embodiments, relaxing proximity criteria to get to the next higher ring is enough to cause further routing.

However, in other embodiments, incremental relaxation of proximity criteria causing transition to the next higher ring continues until further routing can occur (or until the root ring is encountered). That is, a plurality of transitions to higher rings occurs before further routing progress can be made. For example, referring now to FIG. 5, when no further routing progress can be made on ring 531, proximity criteria may be relaxed enough to transition to ring 511 or even to root ring 501.

Figure 6:
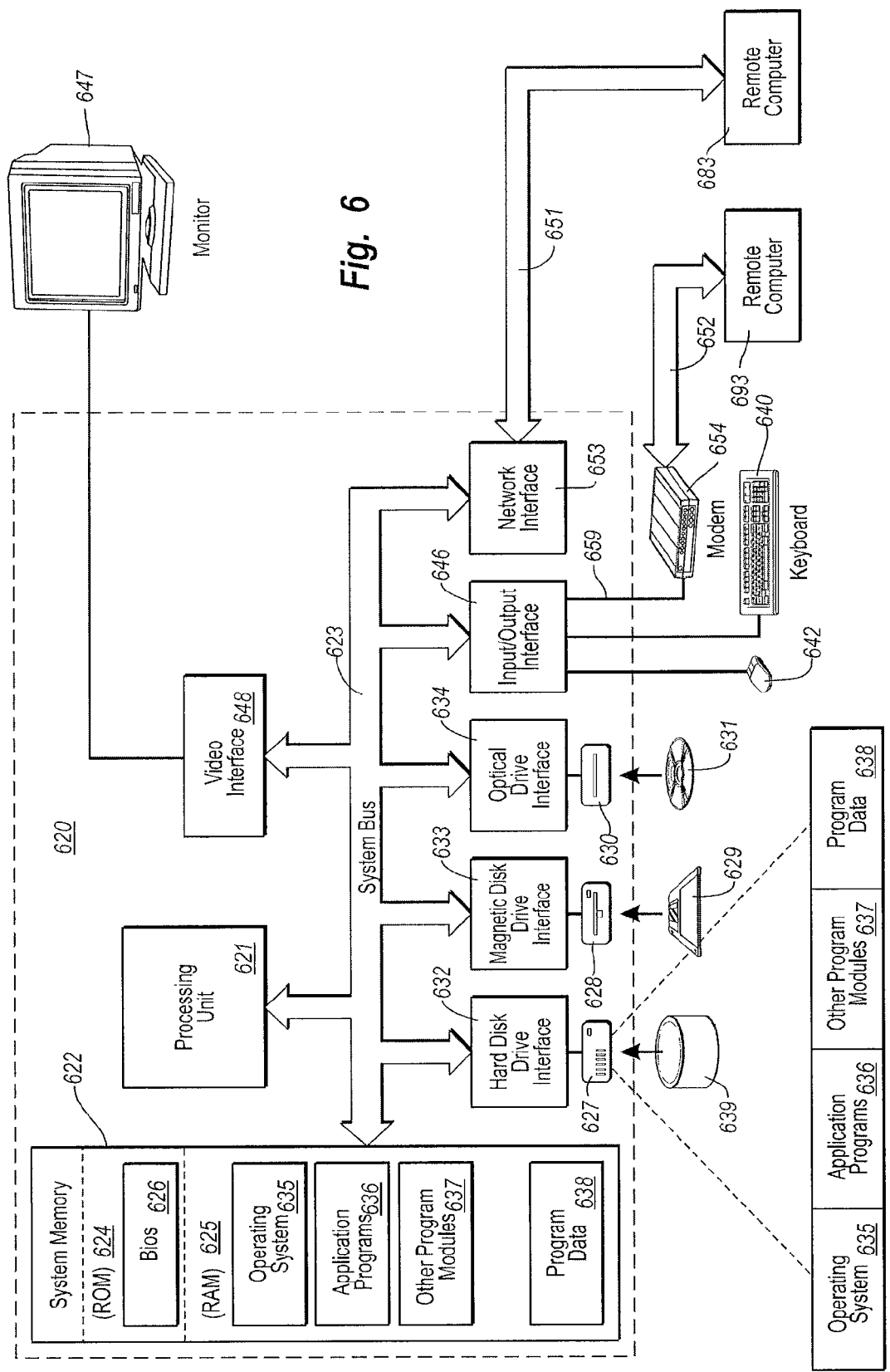
FIG. 6 illustrates a suitable operating environment for the principles of the present invention.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers 669 or other audio output device is also connected to system bus 623 via audio interface 649. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 6, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 659, through which computer system 620 receives data from and/or transmits data to external sources. As depicted in FIG. 6, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, nodes, application layers, and other lower layers, as well as associated data, including routing tables and node IDs may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. At a computer system including one or more processors and system memory, a method for partitioning a sorted linked list of node IDs representing corresponding nodes in a federation infrastructure into a hierarchical tree of rings, the method comprising:

an act of accessing a sorted linked list of unique nodes IDs assigned to a federation infrastructure, each unique node ID assigned to a corresponding node in the federation infrastructure;

an act of accessing a partially-ordered list of a plurality of different types of proximity criteria for partitioning the sorted linked list into a plurality of sub-rings of a hierarchical tree of rings, the partially-ordered list defining the following:

a first proximity criteria type that is to be used at a first sub-ring level when partitioning the sorted linked list into the hierarchical tree of rings;

a second proximity criteria type that is to be used at a second sub-ring level that is below the first sub-ring level when partitioning the sorted linked list into the hierarchical tree of rings; and a third proximity criteria type that is to be used at a third sub-ring level that is below the second sub-ring level when partitioning the sorted linked list into the hierarchical tree of rings;

an act of partitioning the node IDs in the sorted linked list into the hierarchical tree of rings based on the first, second and third proximity criteria types, the hierarchical tree of rings including:

a root ring that includes all the node IDs in the sorted linked list; and a plurality of lower-level sub-rings arranged within a plurality of lower sub-ring levels, including the first, second, and third lower sub-ring levels, the plurality of lower sub-ring levels arranged relative to one another within the hierarchical tree in accordance with the plurality of different types of proximity criteria in the partially-ordered list, each lower sub-ring level including a plurality of different sub-rings at the lower sub-ring level, each different sub-ring at the lower sub-ring level representing a corresponding different equivalence class of node IDs based on assigned values for one or more of the plurality of different proximity criteria used to arrange the lower sub-ring level within the hierarchical tree, wherein node IDs of the same equivalence class within the same lower sub-ring level have the same value for the one or more of the plurality of different proximity criteria used to arrange the lower sub-ring within the hierarchical tree, and wherein nodes of different equivalence classes within the same lower sub-ring level have at least one different value for the one or more of the plurality of different proximity criteria used to arrange the lower sub-ring level within the hierarchical tree of rings; and an act of generating a routing table for at least one node in the federation infrastructure, the at least one node belonging to the root ring as well as at least one sub-ring in each of the first, second, and third lower sub-ring levels, the routing table comprising routing information for the root ring as well as routing information for each sub-ring to which the at least one node belongs, for each ring the routing information including:

a predecessor node to the at least one node, the predecessor node preceding the at least one node in a first direction within the ring;

a successor node to the at least one node, the successor node succeeding the at least one node in the first direction within the ring;

appropriate neighborhood nodes of the at least one node, the neighborhood nodes identified in both the first direction and in a second opposite direction relative to the at least one node based on a neighborhood range and neighborhood size for the ring; and appropriate routing nodes of the at least one node.

2. The method as recited in claim 1, wherein the act of accessing the sorted linked list of unique nodes IDs comprises an act of accessing a bi-directional linked list.

3. The method as recited in claim 1, wherein the act of accessing a partially-ordered list of a plurality of different proximity criteria comprises an act of accessing proximity categories selected from among geographic locations, organizational boundaries, and administrative boundaries.

4. The method as recited in claim 1, wherein the act of partitioning the node IDs in the sorted linked list into the hierarchical tree of rings comprises an act of partitioning the node IDs in the sorted linked list into one or more sub lists that inherent ring parameters from the sorted linked list.

5. The method as recited in claim 1, wherein the act of partitioning the node IDs in the sorted linked list into the hierarchical tree of rings comprises an act of partitioning the node IDs in the sorted linked list into one or more sub lists having individually configured ring parameters that differ from the ring parameters for the sorted linked list.

6. The method as recited in claim 1, wherein for each ring the predecessor node to the at least one node comprises a node having a symmetric partnership with the at least one node within said ring, such that the at least one node is a partner of the predecessor node and the predecessor node is a partner of the at least one node within said ring.

7. The method as recited in claim 1, wherein for each ring the successor node to the at least one node comprises an a node having a symmetric partnership with the at least one node within said ring, such that the at least one node is a partner of the successor node and the successor node is a partner of the at least one node within said ring.

8. The method as recited in claim 1, wherein for each ring the appropriate neighborhood nodes to the at least one node comprise a plurality of nodes having a symmetric partnership with the at least one node within said ring, such that the at least one node is a partner of the appropriate neighborhood nodes and the appropriate neighborhood nodes are partners of the at least one node within said ring.

9. The method as recited in claim 1, wherein for each ring the appropriate routing nodes to the at least one node comprise a plurality of nodes having a symmetric partnership with the at least one node within said ring, such that that at least one node is a partner of the appropriate routing nodes and the appropriate routing nodes are partners of the at least one node within said ring.

10. The method as recited in claim 1, wherein the first proximity criteria type comprises an administrative domain boundary criterion, the second proximity criteria type comprises a geographic boundary criterion, and the third proximity criteria type comprises an organizational boundary criterion.

11. In a federation infrastructure, the federation infrastructure represented by a linked list of nodes, the linked list of nodes partitioned into a hierarchical tree of rings including a root ring and a plurality of lower sub-ring levels of sub-rings, a method for populating a node routing table for a current node taking a plurality of different types of proximity criteria into account, the method comprising:

an act of determining that the current node participates in a plurality of rings in the hierarchical tree of rings, the plurality of rings including the root ring and a plurality of lower level sub-rings, each of the plurality of lower level sub-rings partitioned from the root ring based on a previously defined partially ordered list of different types of proximity criteria, the previously defined partially ordered list defining the following: a first proximity criteria type that is to be used at a first sub-ring level of a hierarchical tree of rings when partitioning the sorted linked list into a hierarchical tree of rings, a second, different proximity criteria type that is to be used at a second, different sub-ring level of a hierarchical tree of rings when partitioning the sorted linked list into a hierarchical tree of rings, and a third, different proximity criteria type that is to be used at a third, different sub-ring level of a hierarchical tree of rings when partitioning the sorted linked list into a hierarchical tree of rings; and an act of inserting different routing information into a routing table for the current node for each ring in the plurality of rings the current node participates in, including the root ring as well as a plurality of lower level sub-rings, for each ring the act comprising:

an act of inserting a predecessor node to the current node into the routing table for the current node, the predecessor node preceding the current node in a first direction within the ring;

an act of inserting a successor node to the current node into the routing table for the current node, the successor node succeeding the current node in the first direction within the ring;

an act of inserting appropriate neighborhood nodes of the current node into the routing table for the current node the current node, the neighborhood nodes identified in both the first direction and in a second opposite direction relative to the current node based on a neighborhood range and neighborhood size for the ring; and an act of inserting appropriate routing nodes of the current node into the routing table for the current node.

12. The method as recited in claim 11, wherein the act of inserting predecessor nodes into the routing table comprises an act of inserting a first predecessor node for a first lower level sub-ring defined in accordance with a subset of the plurality of different proximity criteria types and inserting a second predecessor node for a second lower level sub-ring that inherits proximity criteria from the first lower level sub-ring, the second lower level sub-ring being below the first lower level sub-ring in the hierarchical tree of rings.

13. The method as recited in claim 11, wherein for each ring in the plurality of rings the current node participates in, the act of inserting a predecessor node into the routing table comprises an act of inserting a first predecessor node into the routing table for a first lower level sub-ring at a specified sub-ring level within the hierarchical tree of rings and inserting a second predecessor node into the routing table for a second lower level sub-ring also at the specified sub-ring level within the hierarchical tree of rings.

14. The method as recited in claim 11, wherein the act of inserting successor nodes into the routing table comprises an act of inserting a first successor node for a first lower level sub-ring defined in accordance with a subset of the plurality of different proximity criteria and inserting a second successor node for a second lower level sub-ring that inherits proximity criteria from the first lower level sub-ring, the second lower level sub-ring being below the first lower level sub-ring in the hierarchical tree of rings.

15. The method as recited in claim 11, wherein for each ring in the plurality of rings the current node participates in, the act of inserting a successor node into the routing table comprises an act of inserting a first successor node into the routing table for a first lower level sub-ring at a specified sub-ring level within the hierarchical tree of rings and inserting a second successor node into the routing table for a second lower level sub-ring also at the specified sub-ring level within the hierarchical tree of rings.

16. The method as recited in claim 11, wherein the act of inserting appropriate neighborhood nodes into the routing table comprises an act of inserting a first appropriate neighborhood nodes for a first lower level sub-ring defined in accordance with a subset of the plurality of different proximity criteria types and inserting a second appropriate neighborhood nodes for a second lower level sub-ring that inherits proximity criteria from the first lower level sub-ring, the second lower level sub-ring being below the first lower level sub-ring in the hierarchical tree of rings.

17. The method as recited in claim 11, wherein for each ring in the plurality of rings the current node participates in, the act of inserting appropriate neighborhood nodes into the routing table comprises an act of inserting first appropriate neighborhood nodes into the routing table for a first lower level sub-ring at a specified sub-ring level in the hierarchical tree of rings and inserting second appropriate neighborhood nodes into the routing table for a second lower level sub-ring also at the specified sub-ring level in the hierarchical tree of rings.

18. The method as recited in claim 11, wherein the act of inserting appropriate routing nodes into the routing table comprises an act of inserting first appropriate routing nodes for a first lower level sub-ring defined in accordance with a subset of the plurality of different proximity criteria types and inserting a second appropriate routing nodes for a second lower level sub-ring that inherits proximity criteria from the first lower level sub-ring, the second lower level sub-ring being below the first lower level sub-ring in the hierarchical tree of rings.

19. The method as recited in claim 11, wherein for each ring in the plurality of rings the current node participates in, the act of inserting appropriate routing nodes into the routing table comprises an act of inserting first appropriate routing nodes into the routing table for a first lower level sub-ring at a specified sub-ring level within the hierarchical tree of rings and inserting second appropriate routing nodes into the routing table for a second lower level sub-ring also at specified sub-ring level within the hierarchical tree of rings.

20. A computer program product for use in a federation infrastructure, the federation infrastructure represented by a linked list of nodes, the linked list of nodes partitioned into a hierarchical tree of rings including a root ring and a plurality of lower sub-ring levels of sub-rings, the computer program product for implementing a method for populating a routing table for a current node taking the plurality of different types of proximity criteria into account, the computer program product comprising one or more computer storage devices having stored thereon computer-executable instructions that, when executed by a processor, cause the namespace federation infrastructure to perform the method, including the following:

determine that the current node participates in a plurality of rings in the hierarchical tree of rings, the plurality of rings including the root ring and a plurality of lower level sub-rings, each of the plurality of lower level sub-rings partitioned from the root ring based on a previously defined partially ordered list of different types of proximity criteria, the previously defined partially ordered list defining the following: a first proximity criteria type that is to be used at a first sub-ring level of a hierarchical tree of rings when partitioning the sorted linked list into a hierarchical tree of rings, a second, different proximity criteria type that is to be used at a second, different sub-ring level of a hierarchical tree of rings when partitioning the sorted linked list into a hierarchical tree of rings, and a third, different proximity criteria type that is to be used at a third, different sub-ring level of a hierarchical tree of rings when partitioning the sorted linked list into a hierarchical tree of rings; and insert different routing information into a routing table for the current node for each ring in the plurality of rings the current node participates in, including that root ring as well as a plurality of lower level sub-rings, for each ring the act comprising:

insert a predecessor node to the current node into the routing table for the current node, the predecessor node preceding the current node in a first direction within the ring;

insert a successor node to the current node into the routing table for the current node, the successor node succeeding the current node in the first direction within the ring;

insert appropriate neighborhood nodes of the current node into the routing table for the current node, the neighborhood nodes identified in both the first direction and in a second opposite direction based on a neighborhood range and neighborhood size for the ring; and insert appropriate routing nodes of the current node into the routing table for the current node.

* * * * *